US006983257B2

(12) United States Patent
Gatto

(10) Patent No.: US 6,983,257 B2
(45) Date of Patent: Jan. 3, 2006

(54) SECURITY ANALYST PERFORMANCE TRACKING AND ANALYSIS SYSTEM AND METHOD

(75) Inventor: Joseph G. Gatto, San Francisco, CA (US)

(73) Assignee: Starmine Corporation, San Francisco, CA (US)

(*) Notice: Subject to any disclaimer, the term of this patent is extended or adjusted under 35 U.S.C. 154(b) by 351 days.

(21) Appl. No.: 10/119,082

(22) Filed: Apr. 10, 2002

(65) Prior Publication Data

US 2002/0156714 A1 Oct. 24, 2002

Related U.S. Application Data

(62) Division of application No. 09/296,620, filed on Apr. 23, 1999.
(60) Provisional application No. 60/082,868, filed on Apr. 24, 1998.

(51) Int. Cl.
    *G06F 17/60* (2006.01)

(52) U.S. Cl. .................................. 705/36; 705/35
(58) Field of Classification Search .............. 705/36
    See application file for complete search history.

(56) References Cited

U.S. PATENT DOCUMENTS

| 3,270,190 A | 8/1966 | Lambert ................. 235/194 |
| 5,006,998 A | 4/1991 | Yasunobu et al. ......... 364/513 |
| 5,132,899 A | 7/1992 | Fox ........................ 364/408 |
| 5,365,425 A | 11/1994 | Torma et al. ............. 364/401 |

(Continued)

FOREIGN PATENT DOCUMENTS

| JP | 2000090150 A | 3/2000 |
| WO | WO 9406103 A1 * | 3/1994 |
| WO | WO 01/80124 A2 | 10/2001 |

OTHER PUBLICATIONS

Brown et al., "Composite Analyst Earnings Forecasts: The Next Generation", *Journal of Business Forcasting*, Summer 1990, vol. 9, Issue 2.

Ho et al., "Market Reactions to Messages from Brokerage Ratings Systems", *Financial Analysts Journal*, Feb. 1998, vol. 54, Issue 1.

(Continued)

*Primary Examiner*—Hani Kazimi
*Assistant Examiner*—Narayanswamy Subramanian
(74) *Attorney, Agent, or Firm*—Pillsbury Winthrop Shaw Pittman LLP

(57) ABSTRACT

A system and method for measuring, analyzing, and tracking the past performance of security analysts' earnings estimates and recommendations. A database containing historical information pertaining to analyst earnings estimates and recommendations is downloaded into the system. Pre-calculated data values are also added to the database including adjustment factors a single or set of analysts based upon their historical earnings estimates as compared to actual earnings estimates over time, and other user-defined performance analysis set parameters and metrics. A weighting factor may also be calculated for a set of analysts based upon factors such as the recency of an analyst's earnings estimates. Using these adjustment and weighting factors and each analyst's actual earnings estimate, a custom composite estimate may be derived. A front-end graphical user interface (GUI) is used to view analyst historical data either as raw data or, by using a data visualization technique, as a graph or chart.

16 Claims, 25 Drawing Sheets

U.S. PATENT DOCUMENTS

| | | | | |
|---|---|---|---|---|
| 5,500,795 | A | | 3/1996 | Powers et al. ............... 364/401 |
| 5,502,637 | A | | 3/1996 | Beaulieu et al. ............ 364/408 |
| 5,608,620 | A | * | 3/1997 | Lundgren ....................... 705/1 |
| 5,613,072 | A | | 3/1997 | Hammond et al. ......... 395/204 |
| 5,675,746 | A | * | 10/1997 | Marshall ....................... 705/35 |
| 5,749,077 | A | | 5/1998 | Campbell .................... 705/36 |
| 5,761,442 | A | | 6/1998 | Barr et al. ................... 395/236 |
| 5,774,880 | A | | 6/1998 | Ginsberg ...................... 705/36 |
| 5,774,881 | A | | 6/1998 | Friend et al. ................. 705/36 |
| 5,802,518 | A | | 9/1998 | Karaev et al. ................. 707/9 |
| 5,812,988 | A | | 9/1998 | Sandretto ...................... 705/36 |
| 5,819,271 | A | | 10/1998 | Mahoney et al. .............. 707/9 |
| 5,852,811 | A | | 12/1998 | Atkins .......................... 705/36 |
| 5,864,871 | A | | 1/1999 | Kitain et al. ................. 707/104 |
| 5,893,079 | A | | 4/1999 | Cwenar ........................ 705/36 |
| 5,909,669 | A | | 6/1999 | Havens ......................... 705/11 |
| 5,911,136 | A | | 6/1999 | Atkins .......................... 705/36 |
| 5,918,217 | A | | 6/1999 | Maggioncalda et al. ...... 705/36 |
| 5,946,666 | A | | 8/1999 | Nevo et al. ................... 705/36 |
| 5,948,054 | A | | 9/1999 | Nielsen ....................... 709/200 |
| 5,950,176 | A | | 9/1999 | Keiser et al. .................. 705/37 |
| 5,956,691 | A | | 9/1999 | Powers .......................... 705/4 |
| 5,963,922 | A | | 10/1999 | Helmering .................... 705/35 |
| 6,012,042 | A | | 1/2000 | Black et al. ................... 705/36 |
| 6,012,043 | A | | 1/2000 | Albright et al. ............... 705/36 |
| 6,021,397 | A | | 2/2000 | Jones et al. ................... 705/36 |
| 6,064,986 | A | | 5/2000 | Edelman ....................... 705/36 |
| 6,119,103 | A | | 9/2000 | Basch et al. ................... 705/35 |
| 6,125,355 | A | | 9/2000 | Bekaert et al. ................ 705/36 |
| 6,154,732 | A | | 11/2000 | Tarbox .......................... 705/36 |
| 6,236,980 | B1 | * | 5/2001 | Reese ........................... 705/36 |
| 6,253,192 | B1 | | 6/2001 | Corlett et al. .................. 705/36 |
| 6,317,726 | B1 | | 11/2001 | O'Shaughnessy ............ 705/36 |
| 6,370,516 | B1 | * | 4/2002 | Reese ........................... 705/36 |
| 6,510,419 | B1 | * | 1/2003 | Gatto ........................... 705/36 |
| 2002/0019791 | A1 | | 2/2002 | Goss et al. .................... 705/36 |
| 2002/0022988 | A1 | | 2/2002 | Columbus et al. ............. 705/11 |
| 2002/0082966 | A1 | | 6/2002 | O'Brien et al. ................ 705/36 |

OTHER PUBLICATIONS

Lamonica, "The Best and Worst: Bloomberg's Second Annual Analysts Survey, and the Top Analysts Top Picks", *Financial World*, Jan. 30, 1996, vol. 165, Issue 2.

http://interactive.wsi.com/public/current/summaries/best00.htm (Jan. 5, 2001).

http://interactive.wsi.com/public/current/articles/SB963945297966625438.htm (Jan. 5, 2001).

http://interactive.wsj.com/public/current/articles/SB963945742428637569.htm (Jan. 5, 2001).

http://interactive.wsj.com/public/current/articles/SB963945478117361937.htm (Jan. 5, 2001).

http://interactive.wsj.com/public/current/articles/SB963944657420928118.htm (Jan. 5, 2001).

http://interactive.wsj.com/public/current/articles/SB963945615772798263.htm (Jan. 5, 2001).

Herzberg et al., "Enhancing Earnings Predictability Using Individual Analyst Forecasts", *The Journal of Investing*, Summer 1999.

Charles Schwab: Schwab Introduces Analytics Funds; Utilizes Quantitative Techniques to Seek Above–Market Returns.

Mozes et al., "Modeling Earnings Expectations Based on Clusters of Analyst Forecasts", *The Journal of Investing*, Spring 1999.

https://www.investars.com/home.asp, printed Mar. 26, 2001, 5 pages.

"I/B/E/S Active Express", I/B/E/S International Inc., 1999, 2 pages.

Lawrence D. Brown et al., "The Superiority of Analyst Forecasts as Measures of Expectations: Evidence from Earnings", *The Journal of Finance*, vol. XXXIII, No. 1, Mar. 1978, pp. 1–16.

Lawrence D. Brown et al., "The Predictive Value of Interim Reports for Improving Forecasts of Future Quarterly Earnings", *The Accounting Review*, vol. LIV, No. 3, Jul. 1979, pp. 585–591.

Lawrence D. Brown, "Analyst Forecasting Errors and Their Implications for Security Analysis: An Alternative Perspective", *Financial Analysts Journal*, Jan.–Feb. 1996, pp. 40–47.

Lawrence D. Brown et al., "Analysts can Forecast Accurately!", *The Journal of Portfolio Management*, Spring 1980, pp. 31–34.

L. D. Brown et al., "Perspectives on Forecasting Research in Accounting and Finance", *Journal of Forecasting*, vol. 2, 1983, pp. 325–330.

Robert E. Hoskin et al., "Evidence on the Incremental Information Content of Additional Firm Disclosures Made Concurrently with Earnings, "*Journal of Accounting Research*, vol. 24 Supplement 1986, pp. 1–32.

Lawrence D. Brown, "Earnings Surprise Research: Synthesis and Perspectives", *Financial Analysts Journal*, Mar./Apr. 1997, pp. 13–19.

Charles M. C. Lee et al., "What is the Intrinsic Value of the Dow?", *The Journal of Finance*, vol. LIV, No. 5, Oct. 1999, pp. 1693–1741.

Charles M. C. Lee, "Market Integration and Price Execution for NYSE–Listed Securities", *The Journal of Finance*, vol. XLVIII, No. 3, Jul. 1993, pp. 1009–1038.

Charles M. C. Lee et al., "Volume, Volatility, and New York Stock Exchange Trading Halts", *The Journal of Finance*, vol. XLIX, No. 1, Mar. 1994, pp. 183–214.

Navin Chopra et al., "Summing Up", *The Journal of Finance*, vol. XLVIII, No. 2, Jun. 1993, pp. 811–812.

Navin Chopra et al., "Yes, Discounts on Closed–End Funds are a Sentiment Index", *The Journal of Finance*, vol. XLVIII, No. 2, Jun. 1993, pp. 801–808.

Charles M. C. Lee et al., "Spreads, Depths, and the Impact of Earnings Information: An Intraday Analysis", *The Review of Financial Studies*, vol. 6, No. 2, 1993, pp. 345–374.

Sati P. Bandyopadhyay et al., "Analysts' Use of Earnings Forecasts in Predicting Stock Returns: Forecast Horizon Effects", *International Journal of Forecasting*, vol. 11, No. 3, 1995, pp. 429–445.

Lawrence D. Brown, "Influential Accounting Articles, Individuals, Ph.D. Granting Institutions and Faculties: A Citational Analysis", *Accounting, Organizations and Society*, vol. 21, No. 7/8, Oct./Nov. 1996, pp. 723–754.

Lawrence D. Brown et al., "Security Analyst Superiority Relative to Univariate Time–Series Models in Forecasting Quarterly Earnings", *Journal of Accounting and Economics*, vol. 9, 1987, pp. 61–87.

Lawrence D. Brown et al., "An Evaluation of Alternative Proxies for the Market's Assessment of Unexpected Earnings", *Journal of Accounting and Economics*, vol. 9, 1987, pp. 159–193.

Lawrence D. Brown et al., "The Impact of Annual Earnings Announcements on Convergence of Beliefs", *The Accounting Review*, vol. 67, No. 4, Oct. 1992, pp. 862–875.

Lawrence D. Brown, "Analyst Forecasting Errors: Additional Evidence", *Financial Analysts Journal*, Nov./Dec. 1997, pp. 81–88.

Praveen Sinha et al., "A Re–Examination of Financial Analysts Differential Earnings Forecast Accuracy", *Contemporary Accounting Research*, The Journal of Canadian Academic Accounting Association, vol. 14, No. 1, Spring 1997, pp. 1–42.

Leonard C. Soffer et al., "Post–Earnings Announcement Drift and the Dissemination of Predictable Information", *Contemporary Accounting Research*, The Journal of Canadian Academic Accounting Association, vol. 16, No. 2, Summer 1999, pp. 305–331.

Jacob K. Thomas, "Discussing of "Post–Earnings Announcement Drift and the Dissemination of Predictable Information, *Contemporary Accounting Research*, The Journal of Canadian Academic Accounting Association, vol. 16, No. 2, Summer 1999, pp. 333–340.

Lawrence D. Brown, "Comment on "Post–Earnings Announcement Drift and the Dissemination of Predictable Information"", *Contemporary Accounting Research*, The Journal of Canadian Academic Accounting Association, vol. 16, No. 2, Summer 1999, pp. 341–345.

Lawrence D. Brown et al., "Univariate Time–Series Models of Quarterly Accounting Earnings per Share: A Proposed Model", *Journal of Accounting Research*, vol. 17, No. 1, Spring 1979, pp. 179–189.

Lawrence D. Brown, "Earnings Forecasting Research: Its Implications for Capital Markets Research", *International Journal of Forecasting*, vol. 9, 1993, pp. 295–320.

J. O'Hanlon, "Commentary on: Lawrence D. Brown "Earnings Forecasting Research: Its Implications for Capital Markets Research"", *International Journal of Forecasting*, vol. 9, 1993, pp. 321–323.

Jacob K. Thomas, "Comments on 'Earnings Forecasting Research: Its Implications for Capital Markets Research'", *International Journal of Forecasting*, vol. 9, 1993, pp. 325–330.

Philip Brown, "Comments on 'Earnings Forecasting Research: Its Implications for Capital Markets Research'", *International Journal of Forecasting*, vol. 9, 1993, pp. 331–335.

Mark E. Zmijewski, "Comments on 'Earnings Forecasting Research: Its Implications for Capital Markets Research' by L. Brown", *International Journal of Forecasting*, vol. 9, 1993, pp. 337–342.

Lawrence D. Brown, "Reply to Commentaries on Earnings Forecasting Research: Its Implications for Capital Markets Research", *International Journal of Forecasting*, vol. 9, 1993, pp. 343–344.

Lawrence D. Brown, "A Test of the Reliability of Current Cost Disclosures", *ABACUS—A Journal of Accounting, Finance and Business Studies*, vol. 30, No. 1, Mar. 1994, pp. 2–17.

Lawrence D. Brown, "The Impact of Announcement Timing on the Informativeness of Earnings and Dividends", *Journal of Accounting, Auditing & Finance*, vol. 9, No. 4, Fall 1994, pp. 653–674.

Lawrence D. Brown et al., "The Familiarity with and Perceived Quality of Accounting Journals: Views of Senior Accounting Faculty in Leading U.S. MBA Programs", *Contemporary Accounting Research*, The Journal of Canadian Academic Accounting Association, vol. 11, No. 1–I, Summer 1994 pp. 223–250.

Adrian P. Fitzsimons, et al., "Harmonizing GAAP Differences Among the NAFTA Countries", *The CPA Journal*, May 1995, pp. 43–44.

Lawrence D. Brown, "Book Review of M. Metcalf's 1995 Forecasting Profit", *International Journal of Forecasting*, vol. 12, No. 1, 1996, pp. 176–177.

Lawrence D. Brown et al., "An Information Interpretation of Financial Analyst Superiority in Forecasting Earnings", *Journal of Accounting Reveiw*, vol. 25, No. 1, Spring 1997, pp. 49–67.

Lawrence D. Brown, "Forecasting Selection When All Forecasts are not Equally Recent", *International Journal of Forecasting*, vol. 7, No. 3, 1991, pp. 349–356.

Lawrence D. Brown et al., "Capsules and Comments", *Journal of Accounting Research*, vol. 29, No. 2, Autumn 1991, pp. 382–385.

Lawrence D. Brown et al., "Applying Citation Analysis to Evaluate the Research Contributions of Accounting Faculty and Doctoral Programs", *The Accounting Review*, vol. LX, No. 2, Apr. 1985, pp. 262–277.

Lawrence D. Brown, "Can ESP Yield Abnormal Returns?", *The Journal of Portfolio Management*, vol. 23, No. 4, Summer 1997, pp. 36–43.

Lawrence D. Brown et al., "Do Stock Prices Fully Reflect the Implications of Current Earnings for Future Earnings for ARI Firms?", *Journal of Accounting Research*, vol. 38, No.1, Spring 2000, pp. 149–164.

Lawrence D. Brown et al., "The Association Between Non-earnings Disclosures by Small Firms and Positive Abnormal Returns", *The Accounting Review*, vol. 68, No. 3, Jul. 1993, pp. 668–680.

Lawrence D. Brown et al., "Adaptive Expectations, Time–Series Models, and Analysis Forecast Revision", *Journal of Accounting Research*, vol. 17, No. 2, Aug. 1979, pp. 341–351.

Lawrence D. Brown et al., "Does the FASB Listen to Corporation?", *Journal of Business Finance & Accounting*, vol. 19, No. 5, Sep. 1992, pp. 715–731.

Lawrence D. Brown et al., "Using Citation Analysis to Assess the Impact of Journals and Articles on Contemporary Accounting Research (CAR)", *Journal of Accounting Research*, vol. 23, No. 1, Spring 1985, pp. 84–109.

Kaushik I. Amin et al., "Option Trading, Price Discovery, and Earnings News Dissemination", *Comtemporary Accounting Research*, The Journal of Canadian Academic Accounting Association, vol. 14, No. 2, Summer 1997, pp. 153–192.

Charles M. C. Lee et al., "Investor Sentiment and the Closed–End Fund Puzzle", *The Journal of Finance*, vol. XLVI, No. 1, Mar. 1991, pp. 75–109.

Carolyn M. Callahan et al., "Accounting Information and Bid–Ask Spreads", *Accounting Horizons*, vol. 11, No. 4, Dec. 1997, pp. 50–60.

Charles M. C. Lee, "Accounting–Based Valuation: Impact on Business Practices and Research", *Accounting Horizons*, vol. 13, No. 4, Dec. 1999, pp. 413–425.

Richard Frankel et al., "Accounting Valuation, Market Expectation, and Cross–Sectional Stock Returns", *Journal of Accounting and Economics*, vol. 25, No. 3, Jun. 1998, pp. 283–319.

Ronald King et al., "Corporate Disclosure and Price Discovery Associated with NYSE Temporary Trading Halts", *Contemporary Accounting Research*, The Journal of Canadian Academic Accounting Association, vol. 8, No. 2, Spring 1992, pp. 509–531.

Charles M. C. Lee, "Discussion of "Corporate Disclosure and Price Discovery Associated with NYSE Temporary Trading Halts"", *Contemporary Accounting Research*, The Journal of Canadian Academic Accounting Association, vol. 8, No. 2, Spring 1992, pp. 532–539.

Charles M. C. Lee, "Measuring Wealth", *CA Magazine*, Apr. 1996, pp. 32–37.

Charles M. C. Lee et al., "Inferring Trade Direction from Intraday Data", *The Journal of Finance*, vol. XLVI, No. 2, Jun. 1991, pp. 733–746.

Charles M. C. Lee et al., "Price Momentum and Trading Volume", *The Journal of Finance*, vol. LV, No. 5, Oct. 2000, pp. 2017–2069.

Charles M. C. Lee et al., "Valuing the Dow: A Bottom–Up Approach", *Financial Analysts Journal*, vol. 55, No. 5, Sep./Oct. 1999, pp. 4–23.

Charles M. C. Lee, "Earnings News and Small Traders", *Journal of Accounting and Economics*, vol. 15, No. 2/3, Jun./Sep. 1992, pp. 265–302.

Terry D. Warfield et al., "Response to the FASB Exposure Draft, "Proposed Statement of Financial Accounting Standards—Accounting for Transfers and Servicing of Financial Assets and Extinguishment of Liabilities"", *Accounting Horizons*, vol. 10, No. 3, Sep. 1996, pp. 178–181.

Terry D. Warfield et al., "Response to the FASB Exposure Draft, "Proposed Statement of Financial Accounting Standards—Accounting for Certain Liabilities Related to Closure or Removal of Long–Lived Assets"", *Accounting Horizons*, vol. 10, No. 4, Dec. 1996, pp. 137–141.

Terry D. Warfield et al., "Response to the FASB Exposure Draft, "Proposed Statement of Financial Accounting Standards—Consolidated Financial Statements: Policy and Procedures"", *Accounting Horizons*, vol. 10, No. 3, Sep. 1996, pp. 182–185.

Lawrence D. Brown et al., "Profiting from Predicting Earnings Surprise", *The Journal of Financial Statement Analysis*, Winter 1998, pp. 57–66.

Martin M. Herzberg et al., "Enhancing Earnings Predictability Using Individual Analyst Forecasts", *The Journal of Investing*, Summer 1999, pp. 15–24.

Susan D. Krische et al., "The Information Content of Analyst Stock Recommendations", First Draft: Aug. 8, 2000, Current Draft: Sep. 25, 2000, 40 pages.

www.findarticles.com/m4PRN/1999 Oct. 14/56284107/pl/article.jhtml, printed Feb. 5, 2001, 2 pages.

http://my.zacks.com/?ALERT=www.zacks.com, printed Feb. 2, 2001, 6 pages.

http://www.cianet.com/, printed Feb. 5, 2001, 14 pages.

http://www.factset.com/, printed Feb. 5, 2001, 10 pages.

http://www.iexchange.com/, printed Feb. 5, 2001, 50 pages.

http://www.validea.com/home/home.asp, printed Feb. 5, 2001, 26 pages.

http://www.bulldogresearch.com/default.asp, printed Feb. 5, 2001, 28 pages.

Lawrence D. Brown, "Predicting Individual Analyst Earnings Forecast Accuracy", Sep. 29, 1999, pp. 1–60.

* cited by examiner

SECURITY ANALYST PERFORMANCE TRACKING AND ANALYSIS SYSTEM AND METHOD

CROSS-REFERENCE TO RELATED APPLICATIONS

This application is a divisional of co-pending U.S. application Ser. No.: 09/296,620, filed Apr. 23, 1999, entitled "Security Analyst Performance Tracking and Analysis System and Method," which claims priority to U.S. Provisional Patent Application Ser. No. 60/082,868, filed Apr. 24, 1998.

FIELD OF THE INVENTION

The invention relates to a system and methods for managing and viewing historical security analyst data; for measuring, analyzing, and tracking the historical performance of security analysts' estimates and buy/sell recommendations; and using such performance and other information to automatically produce better predictors of future corporate earnings or stock-price performance.

BACKGROUND OF THE INVENTION

There are many individuals who analyze financial data and financial instruments, such as equity and fixed-income securities. At least some of these individuals analyze such data in an attempt to predict future economic events. Such individuals may include, for example, security analysts and may be known as contributors or analysts, among others. The role of the security analyst is generally well-known and includes, among other things, the issuance of earnings or other financial estimates concerning future economic events and recommendations on whether investors should buy, sell, or hold financial instruments, such as equity securities. Security analyst estimates may include, but are not limited to, quarterly and annual earnings estimates for companies, whether or not they are traded on a public securities exchange.

At least some investors tend to rely on the earnings estimates and recommendations issued by security analysts. Usually more than one analyst follows a given equity security. Analysts often disagree on their earnings estimates and recommendations and, as a result, analysts' earnings estimates and recommendations may sometimes vary.

A number of financial information services providers (FISPs) gather and report analysts' earnings estimates and recommendations. At least some FISPs report the high, low, and mean earnings estimates, as well as mean recommendations for equity securities (as translated to a FISP's particular scale, for example, one to five). In addition, FISPs may also provide information on what the earnings estimates and recommendations were seven and thirty days prior to the most current consensus, as well as the differences between the consensus for a single equity security and that of the relevant industry. Moreover, for some clients, FISPs provide earnings estimates and recommendations on an analysts-by-analyst basis. An advantage of the availability of analyst-level estimates and recommendations is that a client can view the components of the mean estimate or recommendation by analyst. Various drawbacks exist, however, with these approaches and other known techniques.

For example, prior approaches include a software program that displays all current estimates. For a particular fiscal period for a particular security the software provides the ability to simply "include" or "exclude" each estimate (recommendation) from the mean. This is problematic for several reasons. First, commercially available databases of estimates and recommendations contain "current" data on thousands of stocks. Each stock may have estimates from 1 to 70 or more analysts. Each analyst may provide estimates for 1 to many periods. The data may be updated throughout the day. Manually dealing with this volume of information can be time consuming.

A second drawback is that with current techniques, if someone were inclined to determine which estimates (recommendations) should get more weight, and which estimates should get less or no weight, the sheer volume of analysts (over 3,000 for U.S. stocks alone) makes it extremely difficult to know which analysts provide more useful information than others. Current techniques lack sufficient ability to intelligently measure historical analyst performance and beneficially use such measurements.

A third drawback is that it while it is possible to imagine various weighting systems or algorithms, it is difficult to effectively implement or test them. Current systems do not provide the ability to effectively devise new estimate (recommendation) weighting algorithms; nor do they provide the ability to easily test their (hypothetical) historical performance.

A fourth drawback with current techniques is that there are limited or no tools for effectively viewing historical estimates and recommendations as time-series graphs or for overlaying this information over a graph of prices for the securities to understand the relationship between changes in estimates (recommendations) to changes in securities prices. These and other drawbacks exist with existing systems

SUMMARY OF THE INVENTION

An object of the invention is to overcome these and other drawbacks of prior approaches and techniques.

Another object of the invention is to measure and use the historical performance of an analyst's past estimates or recommendations to better predict future earnings or effectively use analysts' recommendations.

Another object of the invention is to provide a tool to automatically create more accurate composite estimates (predictors) by adjusting one or more analyst's estimates up (down) if they have a historical tendency to under (over) estimate the value of future quantities such as earnings.

Another object of the invention is to automatically create an improved composite estimate for one or more securities by calculating a weighting factor for each analyst's estimate that gives relatively more weight to certain analyst estimates and relatively less or no weight to other analyst estimates, where the weighting factor is based upon predetermined criteria.

Another object of the invention is to objectively measure the historical accuracy of the estimates made by one or more Contributors (analysts and/or brokers)

Another object of the invention is to provide a tool to measure historical accuracy of predictions with the flexibility for the user to specify one or more of the time frame of estimates to be measured (e.g., those estimates 9–12 months prior to actual report date), the number of periods over which to aggregate performance, the error metric used to calculate performance, and the stocks over which to aggregate performance.

Another object of the invention is to exclude from calculation of an automatically generated composite all estimates (recommendations) that do or do not meet certain criteria.

Another object of the invention is to provide a tool to automatically identify a cluster, or major revision of estimates (or recommendations), based upon predetermined criteria Another object of the invention is to automatically create a composite estimate (or recommendation) by excluding (or assigning reduced weight) to those estimates received prior to the beginning of a cluster.

Another object of the invention is to automatically calculate an improved composite estimate or recommendation by both adjusting estimates of earnings by calculating an earnings estimate based upon the adjustment and weighting factors for a plurality of analysts' estimates.

Another object of the invention is to measure the historical performance of a single or plurality of analysts' estimates and to measure the historical profitability of recommendations of either a single or plurality of analysts.

Another object of the invention is to compare the performance of analysts' estimates and recommendations for a particular financial instrument or industry.

Another object of the invention is to enable a user to define the method for measuring the performance of an analyst by allowing for the specification of a number of security analyst performance parameters or metrics.

Another object of the invention is to allow for the creation, storage, and recall of security autoweight models and related estimates where the models automatically assign weights to each analyst's estimate or recommendation based on stored, user-defined criteria.

Another object of the invention is to test autoweight models by applying predetermined criteria.

Another object of the invention is to provide a data visualization technique to allow a user to display simultaneously the estimates of earnings (or other quantities such as revenues) for a single or plurality of contributors using predetermined criteria, along with the actual earnings (or other quantity) corresponding to those estimates and other related parameters or metrics.

Another object of the invention is to provide a data visualization technique to allow a user to display simultaneously time-series charts of estimates of earnings (or of estimates of other quantities such as revenues, or of recommendations) for a single or plurality of contributors using predetermined criteria, along with a time-series of the security's price over the corresponding time interval.

Another object of the invention is to provide a data visualization technique to allow one to display, as either raw numerical data, a chart, or graph, a number of earnings estimate performance metrics for either a single or plurality of analysts, based upon predetermined criteria.

Another object of the invention is to provide a data visualization technique to display simultaneously the numerical representation of a single or plurality of security analysts' purchase recommendations for predetermined criteria, along with the actual change in the value of the security corresponding to the recommendation(s).

These and other objects of the invention are carried out, according to various preferred embodiments of the invention.

According to one embodiment of the invention, an improved estimate of a future earnings event can be automatically developed for one or a plurality of securities by applying a weighting factor to each analyst's estimate. The weighting factor may be based on a variety of factors as specified in an autoweight model such as the relative recency of each analyst's estimate, the analyst's historical performance, or other factors. For example, if an estimate is relatively old, it may get a relatively low or zero weighting, whereas more recent estimates may be given a relatively high weighting. The sum of the weights assigned to analyst's estimates for a particular fiscal period should equal one. Two or more factors may be used in combination. Autoweight models allow for the definition of an arbitrary number of different factors. For example, an analyst may receive a score for her past performance and another score for the recency of her estimate. Using a pre-defined function, these factor scores can be consolidated with the result being a summary weight for each analyst. Using the automatically calculated weights, the estimates and revisions of either a single or plurality of analysts' can be composited for a given fiscal period by calculating the weighted average of estimates such that an improved estimate can be calculated. For example, a custom composite estimate or composite estimate may be calculated by multiplying a plurality of analysts' current earnings estimates for a particular security by their respective weighting factors and then summing over each estimate. Similarly, analyst recommendations at a point in time can be automatically weighted according to different factors to create an improved composite recommendation by multiplying each analyst's recommendation by that analyst's weighting factor.

According to another aspect of the invention, a system and method enable a user to track, analyze, and compare analysts' past performances. According to this embodiment, a database may be provided that contains information about analyst's past performance through the combination of each analyst estimate record in the database has a number of predetermined data fields.

The database may comprise a combination of estimate data comprising raw data regarding estimates and performance for analysts and a pre-calculated values that are calculated and stored in the database for further analysis. The pre-calculated values may be based on the estimate data loaded from a secondary source analyst performance database or maintained on that database from a transaction processing system, for example.

These pre-calculated values may include error metric values for each security, for each historical fiscal period in the database, for each contributor (e.g., analyst/broker pair) is a row in the database. Each row comprises multiple error metrics valued over a range of time periods. For example, if three error metrics were provided, the system may maintain a value for error metric 1 over a 0–3 month time period, error metric 1 over a 3–6 month time period, error metric 2 over a 0–3 month time period, error metric 2 over a 3–6 month time period, error metric 3 over a 0–3 month time period, and error metric 3 over a 3–6 month time period. Of course, a great number of such error metrics may be stored and the number and ranges of the time periods may also vary according to the present invention.

Example fields for the pre-calculated portion of the database may comprise an analyst identifier, an event identifier, an analyst estimate date, a raw error indicator (analyst estimate minus the actual earnings for a particular event), other error metrics, such as the error percent to actual earnings, error percent to consensus, other user-defined error metrics, and the number of days between the estimate of an event and the actual event. This last parameter can provide a significant advantage with respect to aspects of the present invention because, in many cases, a more recent earnings estimate or revision is likely to be more accurate than an estimate made months prior to an earnings event. Estimates made prior to an earnings event may be classified according to Earliness Time Bins, where each Time Bin represents a range of days preceding an earnings event. For example, one Earliness Time Bin may include all estimates made between 0 and 90 days prior to an earnings event.

By using this analysts' past performance database, the invention enables a user to rank, measure, and analyze analysts' historical performances based upon any metric, including a comparison of all or a subset of analysts within an Earliness Time Bin; a comparison of selected analysts across several Earliness Time Bins; scatterplots of percent errors versus number of days early for a single or plurality of analysts; and other comparisons.

According to one embodiment, the invention allows for the rapid visualization and analysis of analysts' estimates or recommendations by creating and maintaining indices for predetermined data relationships, pre-calculating and storing predetermined analyst performance metrics, and calculating, compressing and storing time series estimates and summary measures of those estimates.

According to another aspect of the invention, a front-end graphical user interface (GUI) is provided to facilitate analysis of analysts' prior performance for one or more securities. Preferably, the prior estimates are stored in a database that includes, but is not limited to, fields corresponding to a security identifier for each security; a plurality of earnings events, such as, for example, the issuance of a company's actual quarterly or yearly earnings reports; earnings event dates; an analyst and broker identifier; and predetermined periods of times preceding an earnings event. Other fields and types of data also may be included. The front-end GUI will allow a user to select easily a security, earnings event, event date, Earliness Time Bin, and Contributors for analysis. The retrieved analysis information may be viewed as either raw data or, by using a data visualization technique, as a chart or graph.

According to one aspect of this embodiment of the invention, each analysts' estimates and revisions thereto are displayed simultaneously, along with the actual earnings of the companies they follow. Preferably, each analysts' estimate is plotted on a graph displaying the estimate (in dollars and cents) on the vertical or y axis and time (in days) on the horizontal or x axis. More specifically, each analyst's estimate is displayed as a horizontal line at a level corresponding to the estimate and having a length equal to the number of days that the analyst's estimate was at that level. If any analyst revises that estimate, a new horizontal line is displayed at the new level and the two lines are connected by a vertical line, such that the plot takes the form of a step function.

Other levels of control may be provided including displays of derived time series such as high estimates, mean estimates, low estimates, and/or Composite estimates with or without a simultaneous display of actual earnings. To further facilitate the viewing of such data, each estimate, whether reflecting the determination of an individual analyst or a derived estimate, may be assigned a unique color. A legend box may also be displayed simultaneously with a chart or graph that indicates which color is assigned to which estimate. Selecting an analyst or derived estimate series in the legend highlights (emboldens) the corresponding time series in the chart. The user may show or hide individual estimate series by means of on/off controls in the legend. The user may sort the legend by analyst name, broker name, or other criteria. Advanced navigation techniques include selecting an analyst from the legend and issuing a command (e.g., from a right-click pop-up menu) to jump to a detailed display of historical performance for the selected analyst. The user has the ability to arbitrarily change the scale of viewing and can zoom in to fill the screen with two days of information or zoom out to see five years of information. Optionally, a chart of the selected securities prices can be displayed on a chart below the estimates chart. The horizontal (time) axes of the two chart are synchronized so that zooming one chart zooms. This technique is valuable for understanding the impact on changes of estimates (or derived estimates) on changes in security price. Viewing historical estimates in this fashion may provide context and thus aid in the understanding of an analyst's performance track record and estimate revision patterns. This information can be used valuably when deciding how to appraise changes in an analyst's current estimates. This information can also be used valuably in building understanding of estimate and recommendation changes in general and therefore help the user create more valuable autoweight models.

According to another embodiment of the invention, a user may rank, measure, and analyze the profitability of analysts' recommendations regarding the advisability of purchasing, selling, or holding a particular security at any given time. More specifically, the system allows a user to control, manipulate, and otherwise refine the normalization and translation of the recommendation descriptions of individual analysts to the scales published by FISPs such as First Call or IBES, which are used generally in the financial and business communities. In addition, weighting factors, similar to the ones described above relating to earnings estimates, and/or adjustment factors may be calculated for analysts' recommendations. Therefore, the system enables a user to view an analyst's "corrected" estimate through the use of the adjustment and weighting factor. The system also enables a user to compare and chart the profitability of following the recommendation of one analyst versus that of another analyst or the average recommendation. In addition, users may create portfolio-creation rules to determine when and how much of a security to buy or sell and, furthermore, to track the value and test the profitability of having carried out such rules for a single or plurality of analysts over any given time period.

DETAILED DESCRIPTION OF THE DRAWINGS

FIG. 4 is a depiction of a graphical user interface used to input and designate analysis performance set parameters and metrics for displaying the historical earnings estimates and revisions of such estimates of a plurality of analysts and other related information;

FIG. 5 is a depiction of a graphical user interface used to input and designate analysis performance set parameters and metrics for displaying either the raw data or visual display of a number of representations of the historical accuracy of the earnings estimates of either a single or a plurality of analysts;

Figure 10A:
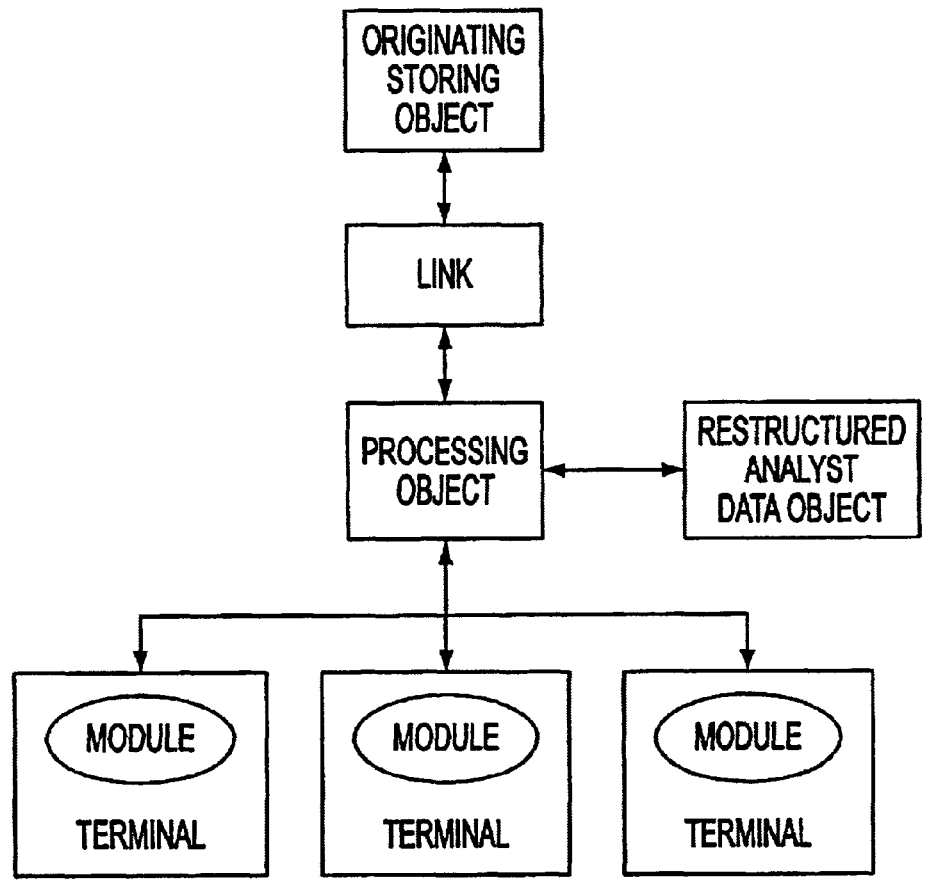
Figure 10B:
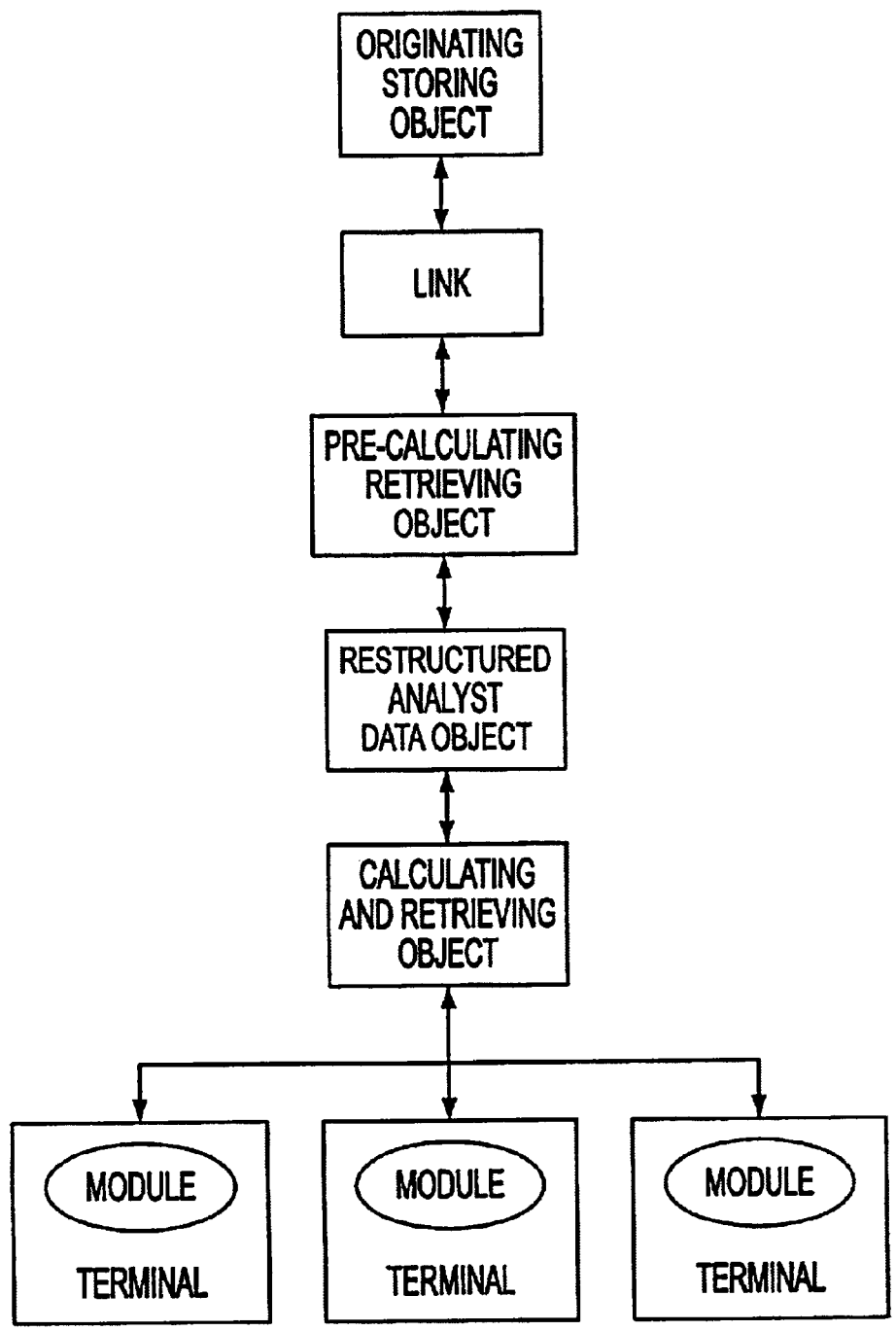
Figure 10C:
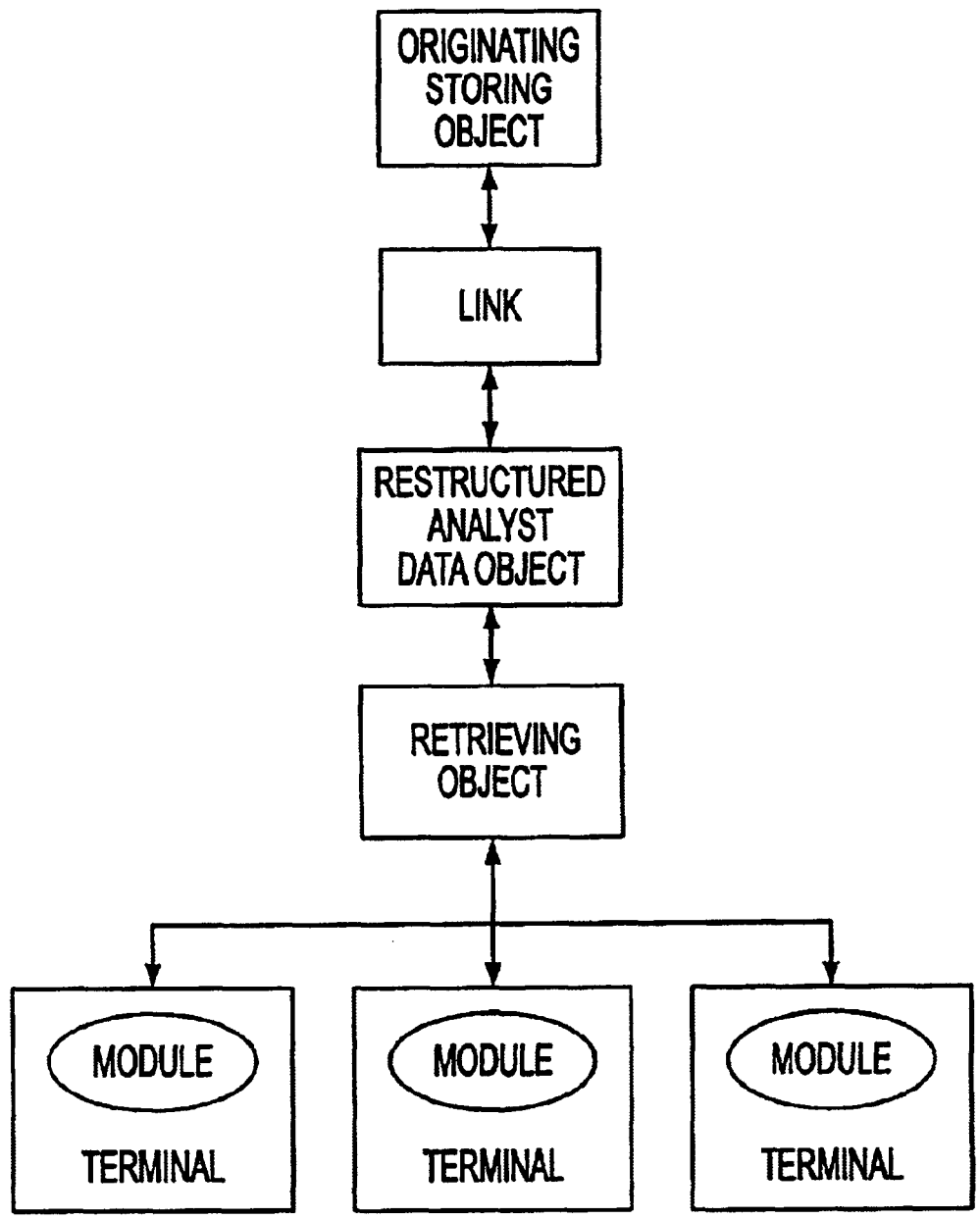

FIGS. 10a–c depict system architectures according to various embodiments of the present invention.

Figure 11A:
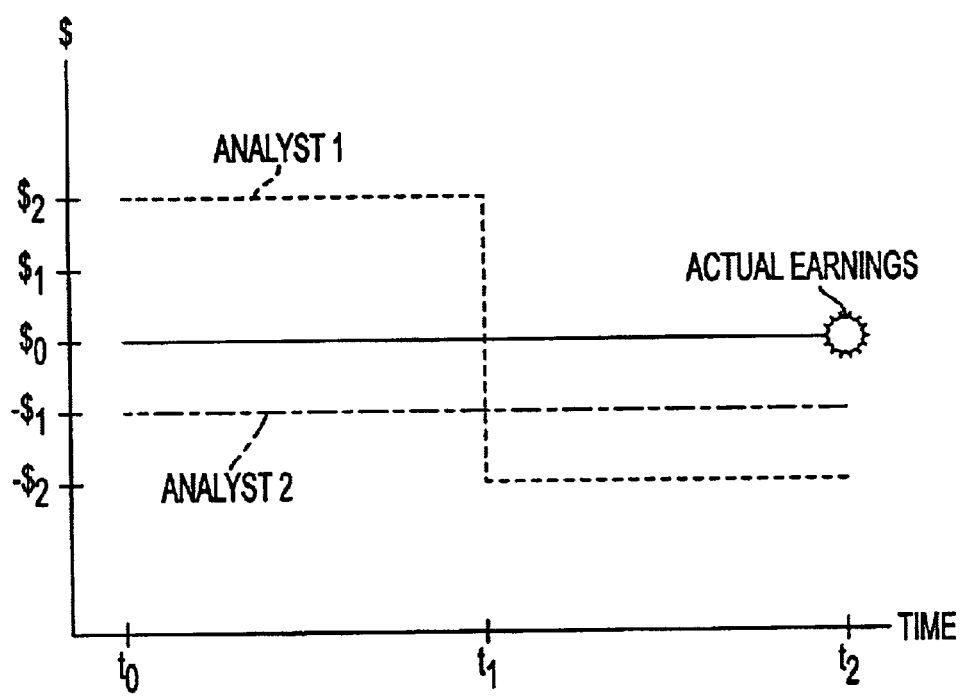
Figure 11B:
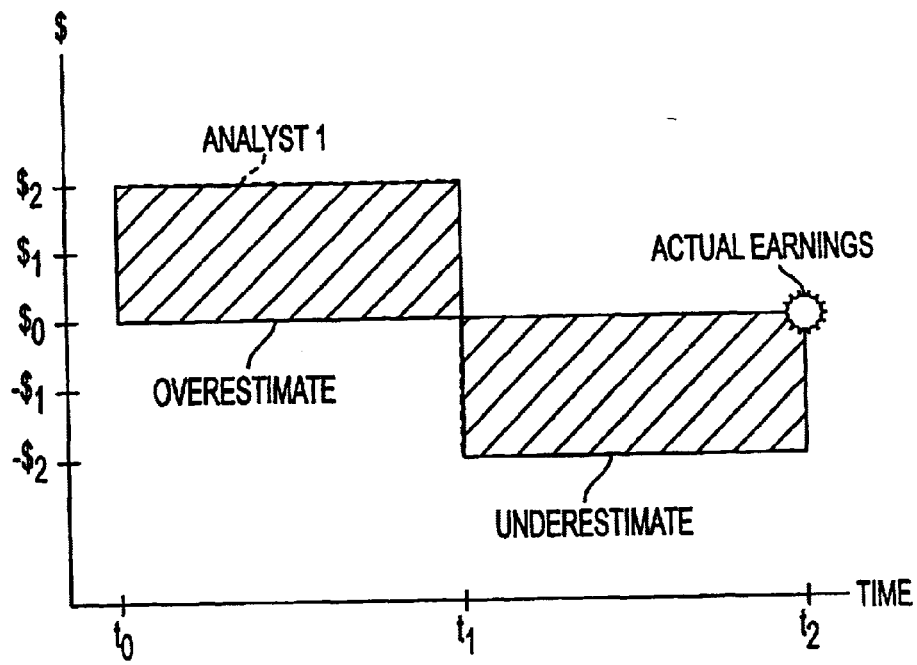
Figure 11C:
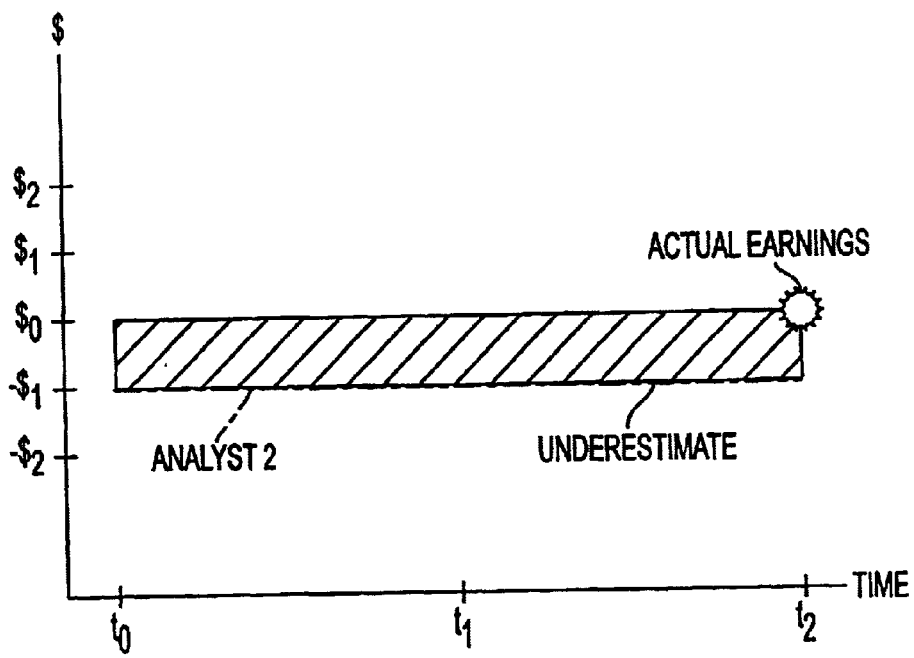

FIGS. 11a–c depict graphs illustrating comparative performance by two analysts with actual outcome.

Figure 12:
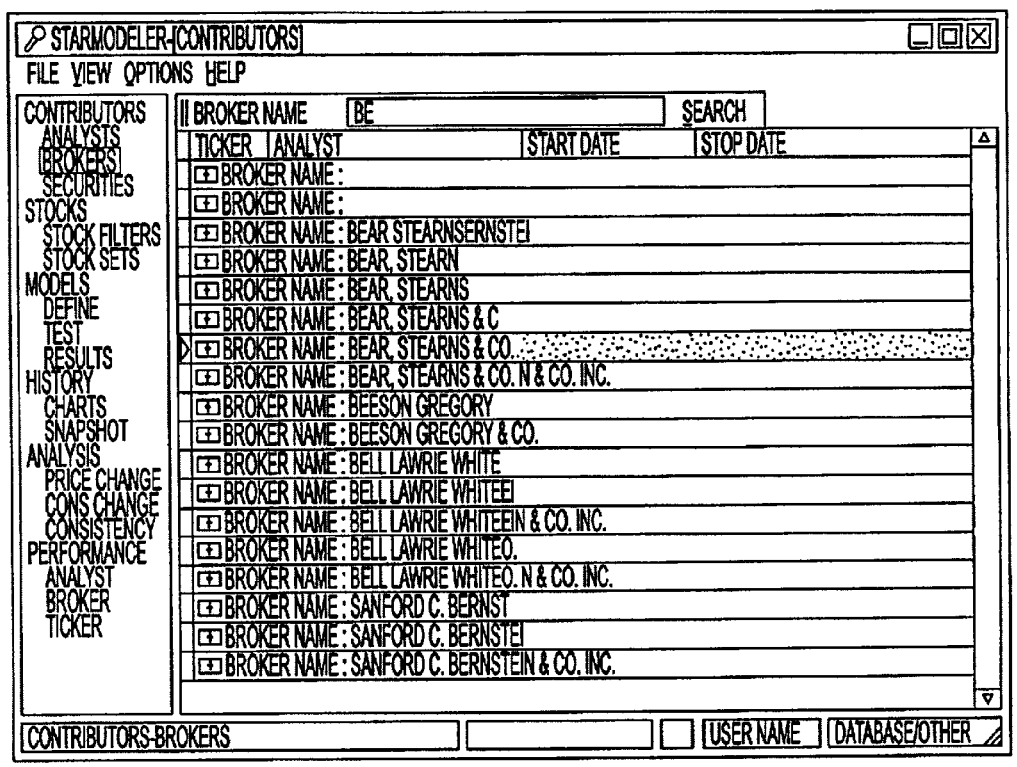

FIG. 12 depicts a screen display of a analyst search screen according to an embodiment of the present invention.

Figure 13:
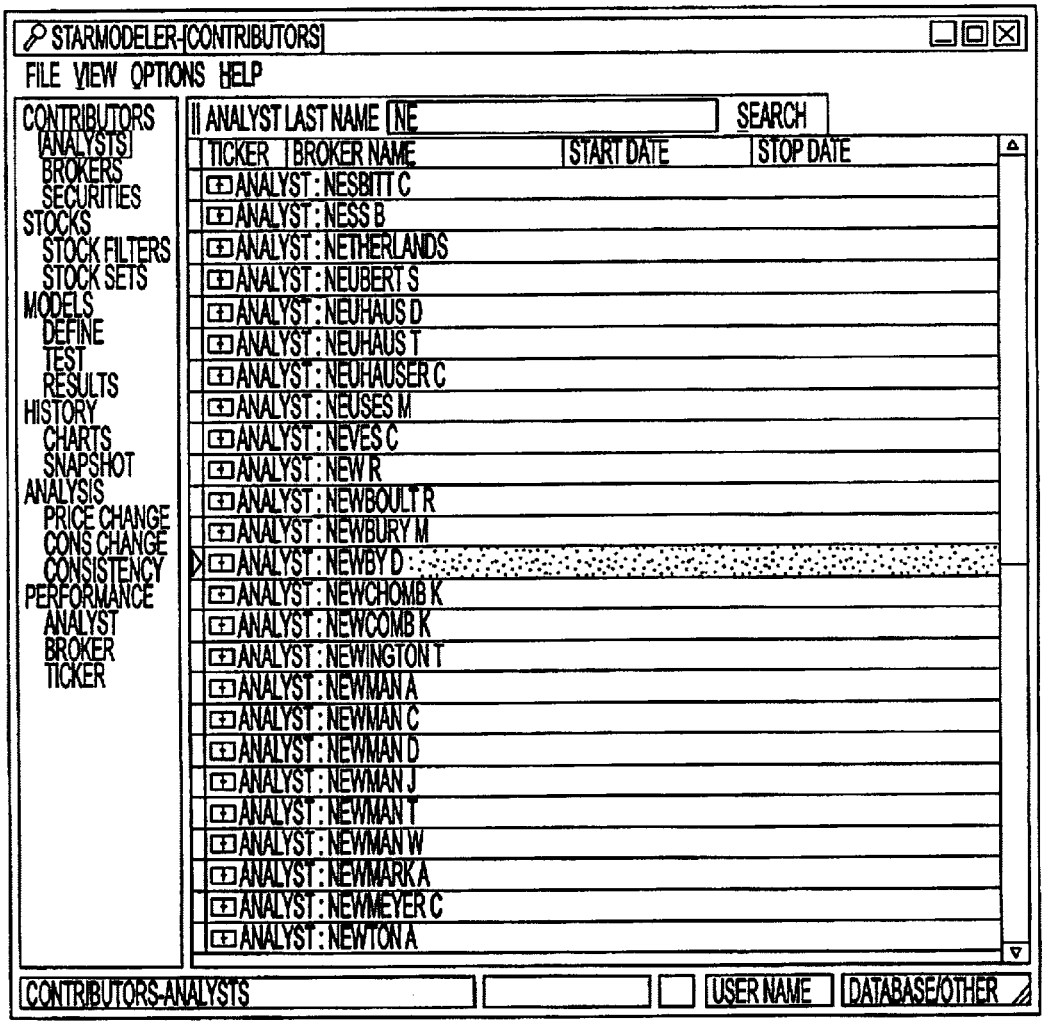

FIG. 13 depicts a screen display of a broker search screen according to an embodiment of the present invention.

Figure 14:
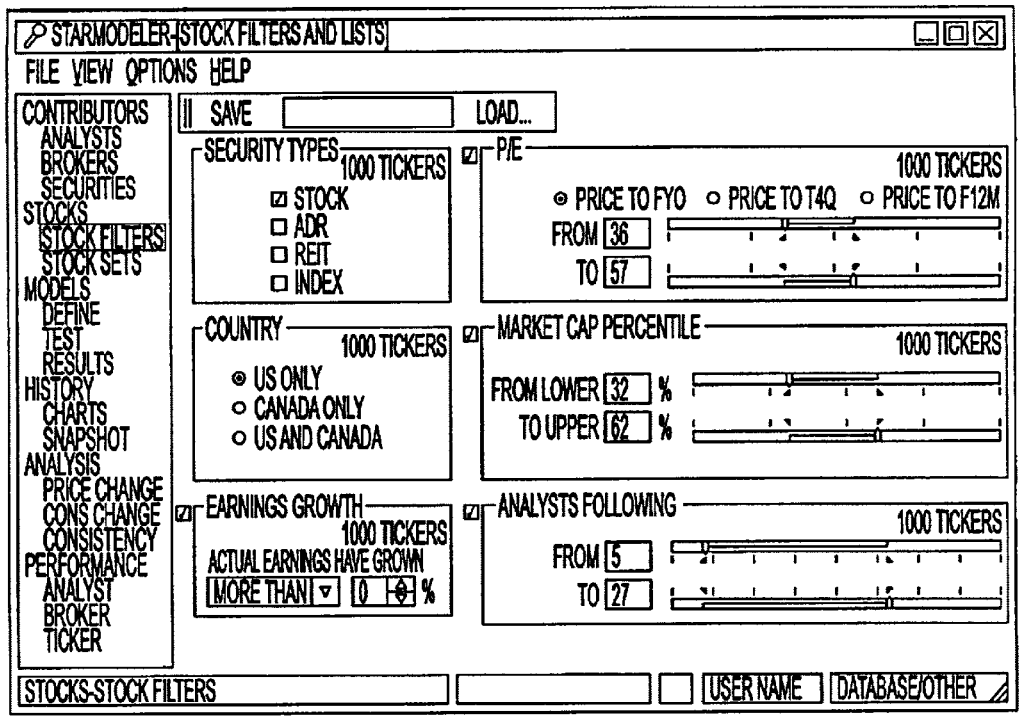
Figure 14:
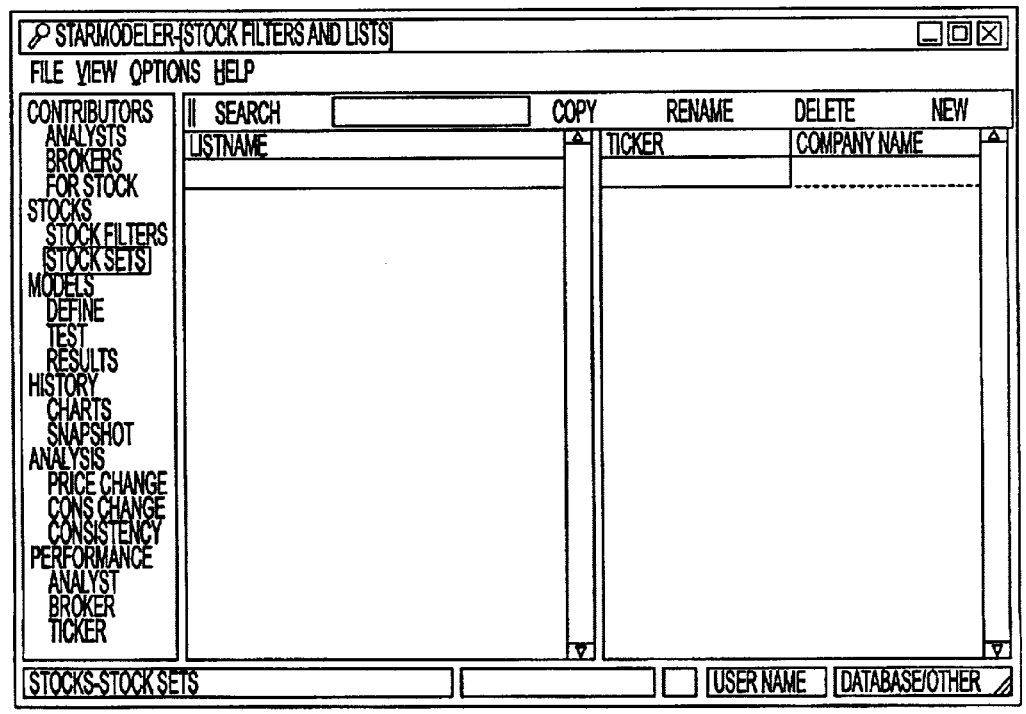

FIG. 14 depicts a screen display of a stock filter and list screen according to an embodiment of the present invention.

Figure 15:
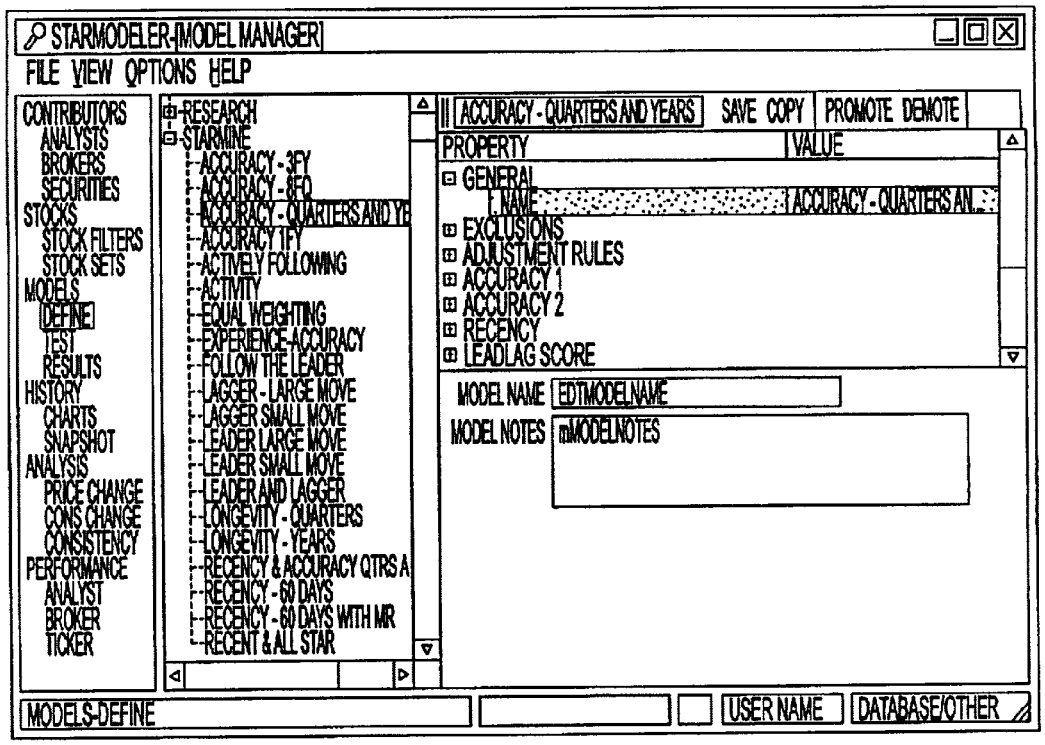

FIG. 15 depicts a screen display of a model manager screen according to an embodiment of the present invention.

Figure 16:
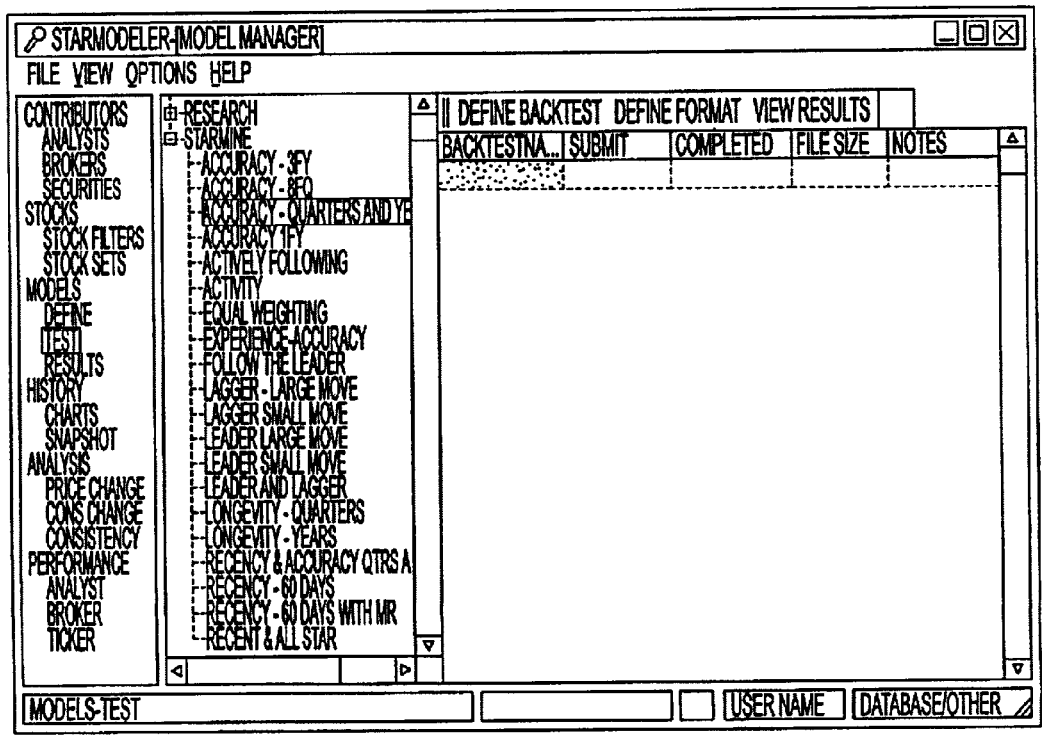

FIG. 16 depicts a screen display of a model manager according to an embodiment of the present invention.

Figure 17:
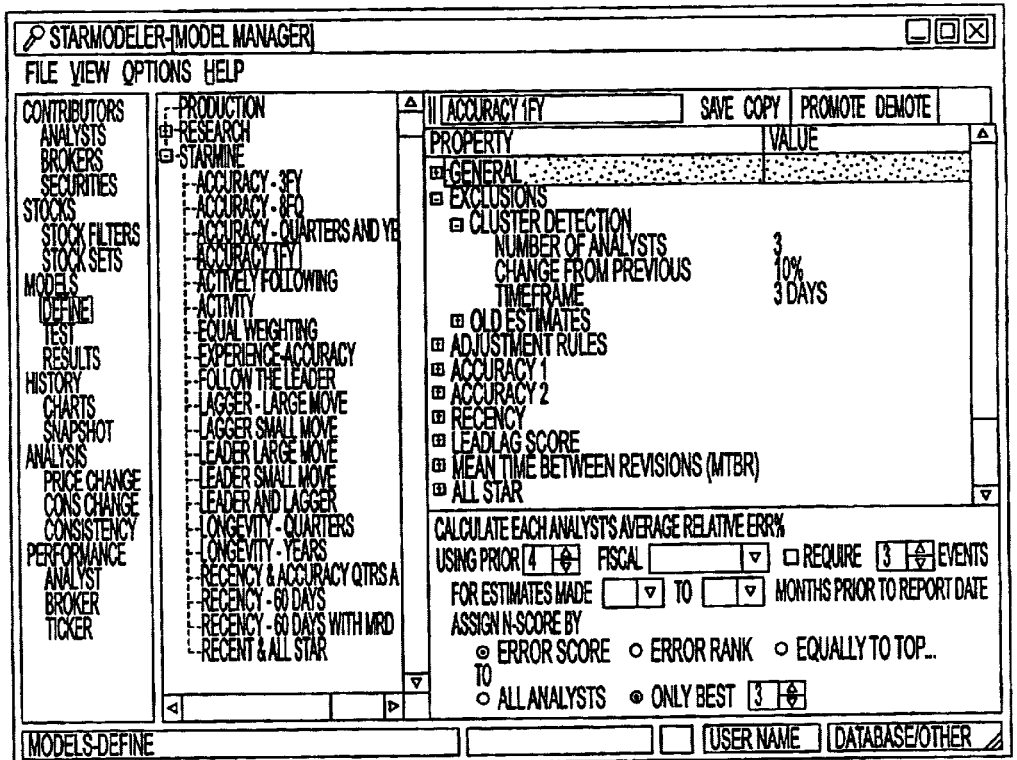

FIG. 17 depicts a screen display of a model manager screen according to an embodiment of the present invention.

Figure 18:
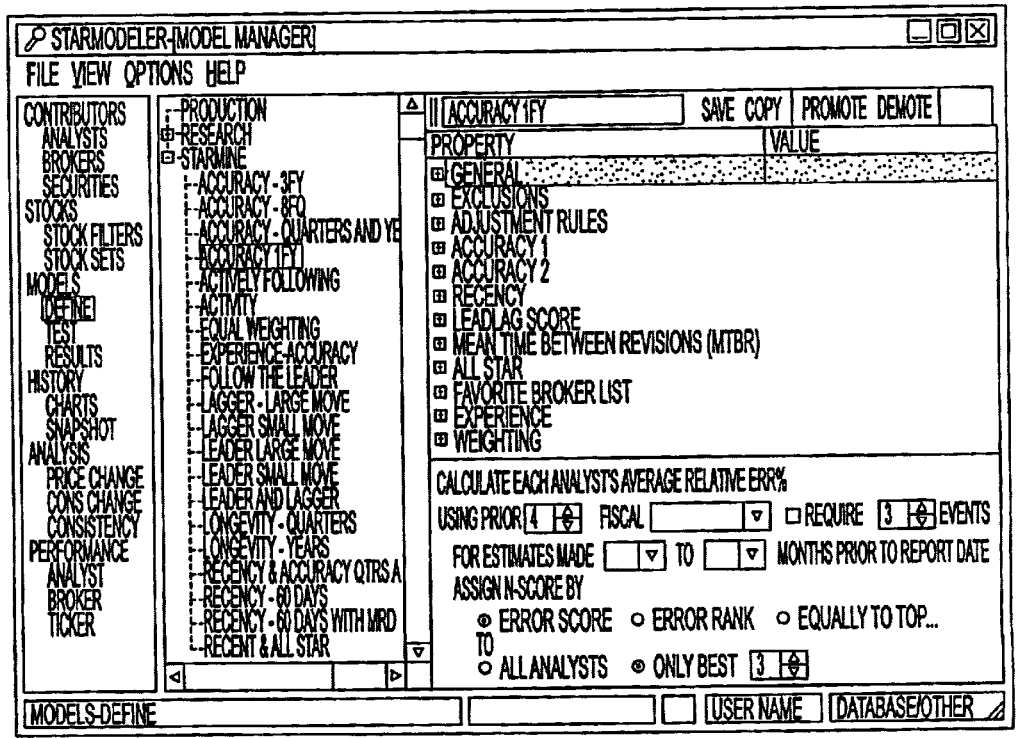

FIG. 18 depicts a screen display of a model manager screen according to an embodiment of the present invention.

Figure 19:
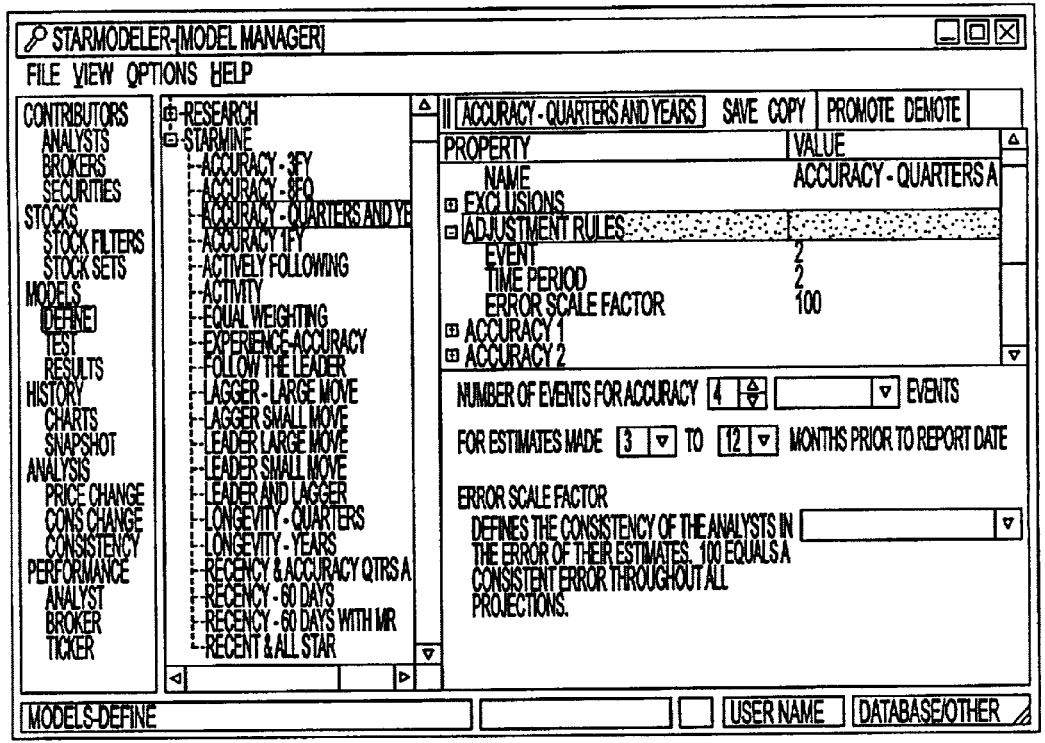

FIG. 19 depicts a screen display of a model manager screen according to an embodiment of the present invention.

Figure 20:
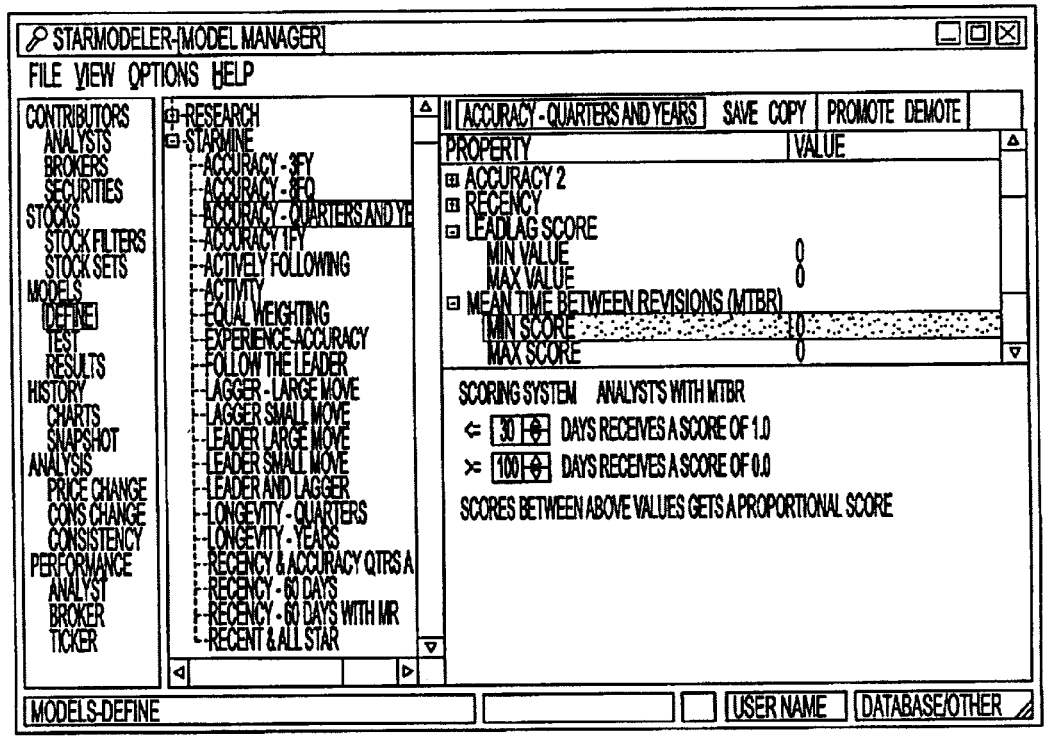

FIG. 20 depicts a screen display of a model manager screen according to an embodiment of the present invention.

Figures 21, 22:
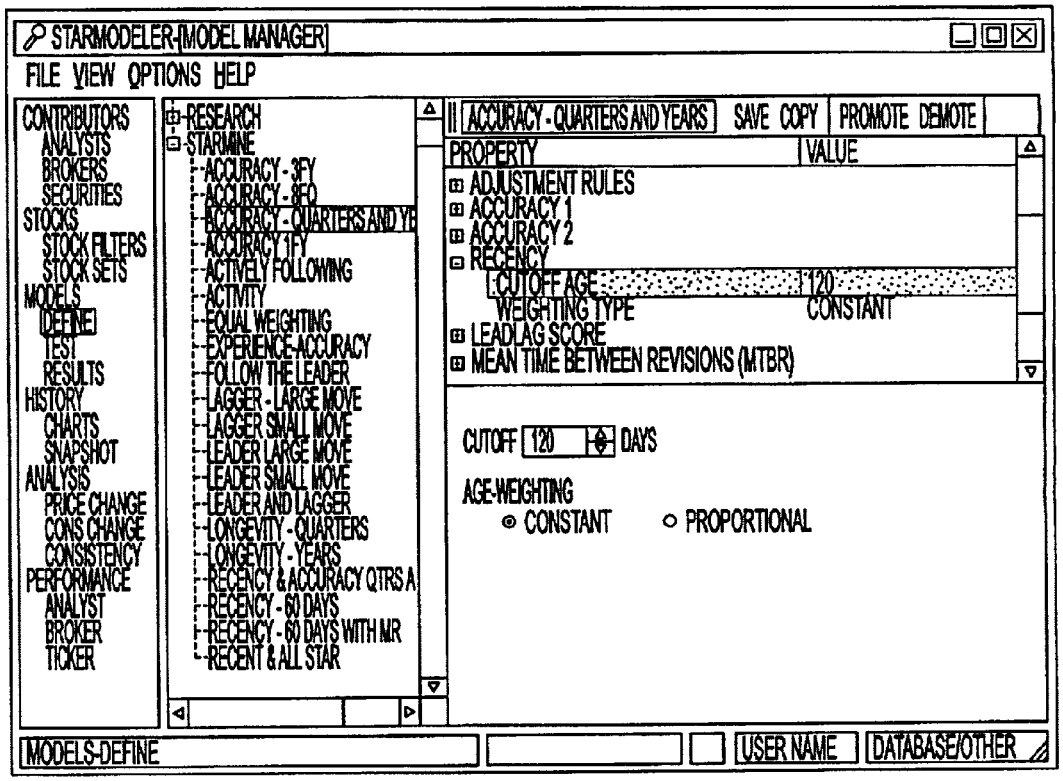

FIG. 21 depicts a screen display of a model manager screen according to an embodiment of the present invention.

FIG. 22 depicts a screen display of a model manager screen according to an embodiment of the present invention.

Figure 23:
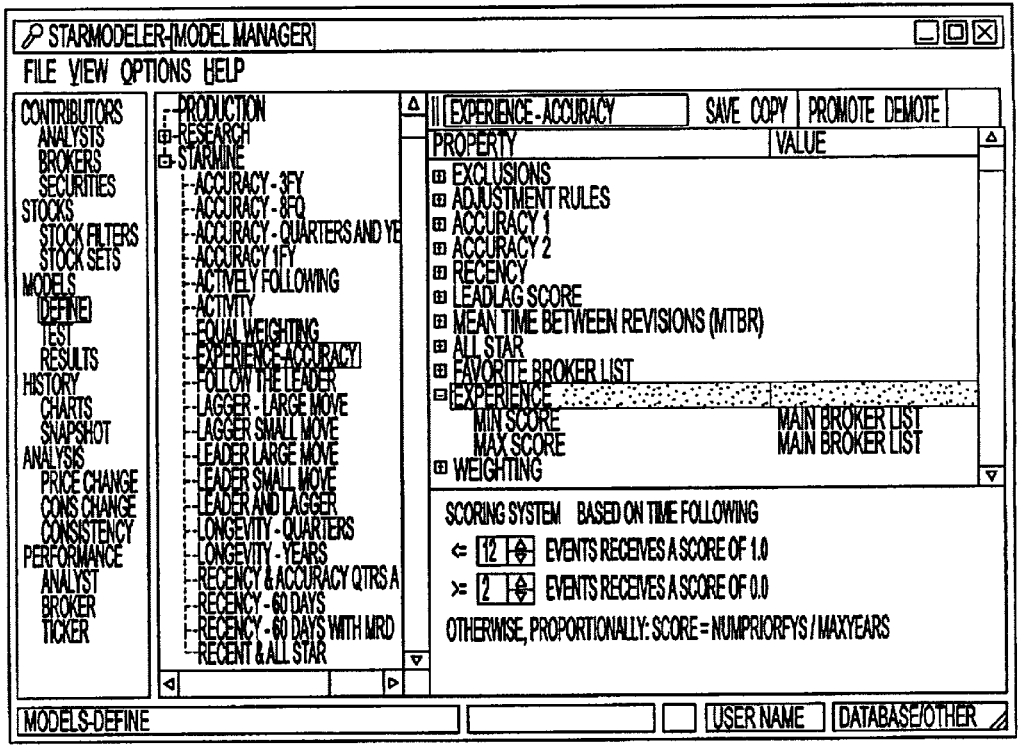

FIG. 23 depicts a screen display of a model manager screen according to an embodiment of the present invention.

Figure 24:
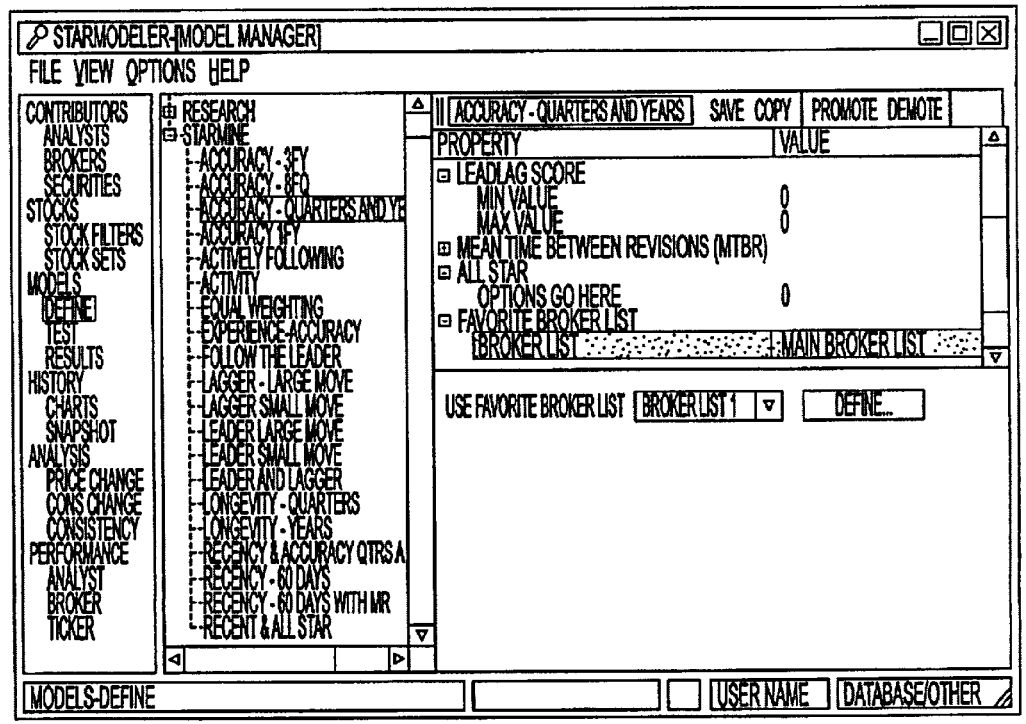

FIG. 24 depicts a screen display of a model manager screen according to an embodiment of the present invention.

Figure 25:
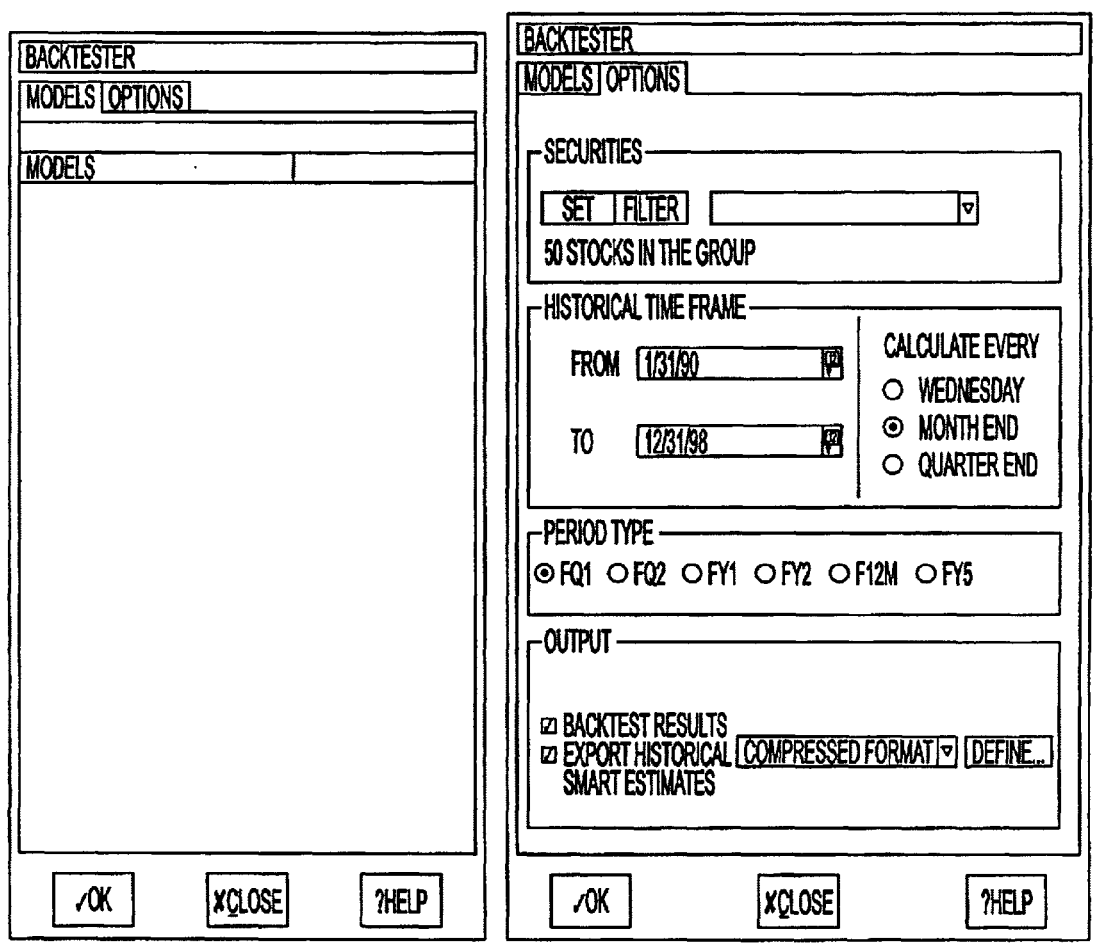

FIG. 25 depicts a screen display of a backtester screen according to an embodiment of the present invention.

Figure 26:
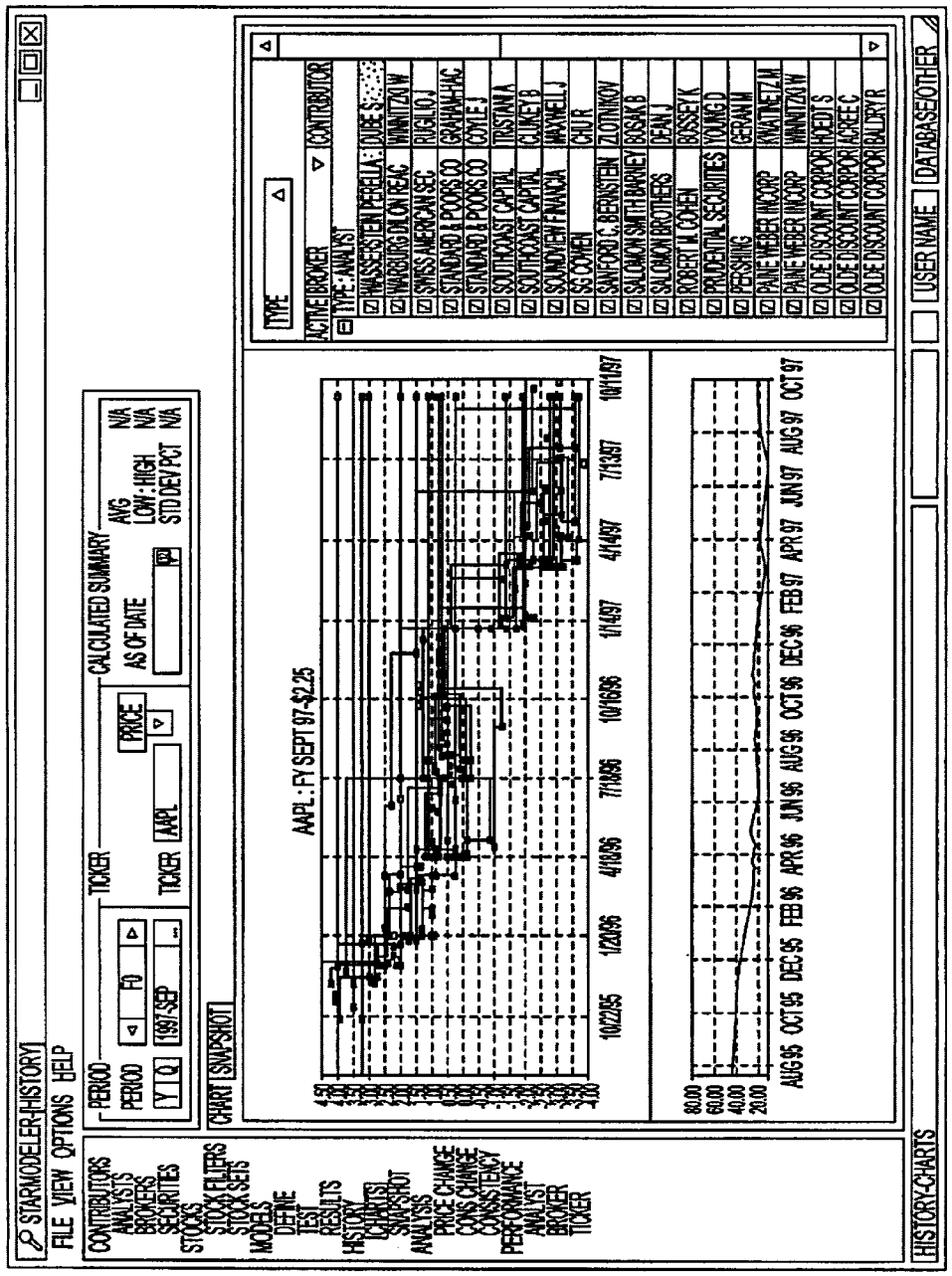

FIG. 26 depicts a screen of a historical view of analyst's estimates over time according to an embodiment of the present invention.

Figure 27:
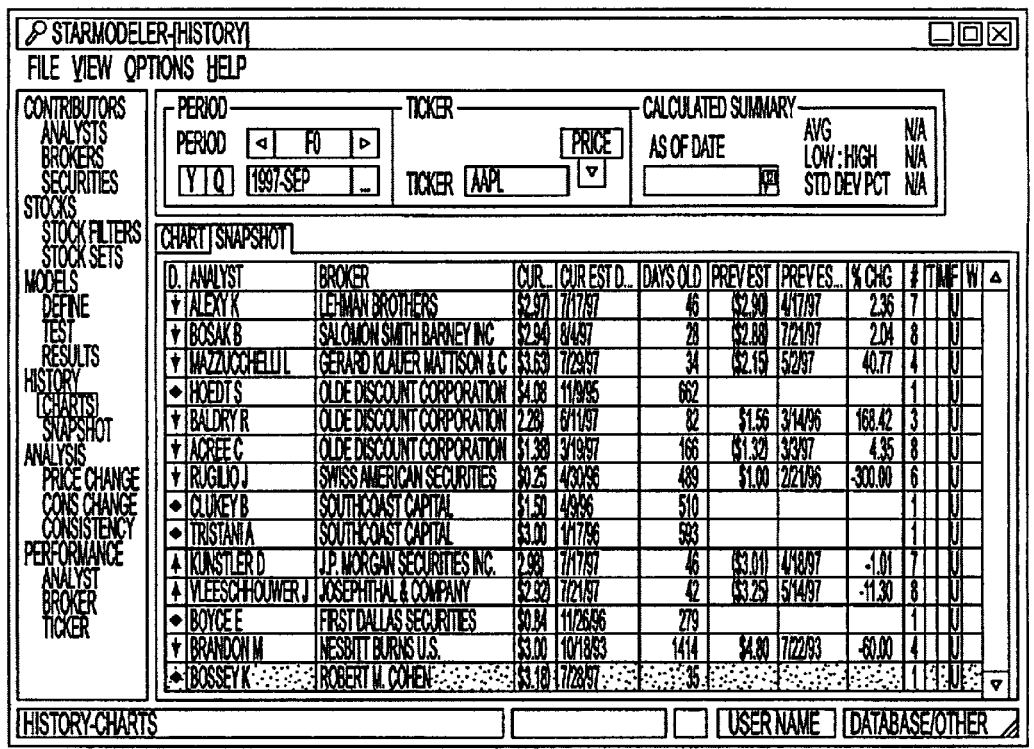

FIG. 27 depicts a screen of a historical view of analyst's estimates over time according to an embodiment of the present invention.

Figure 28:
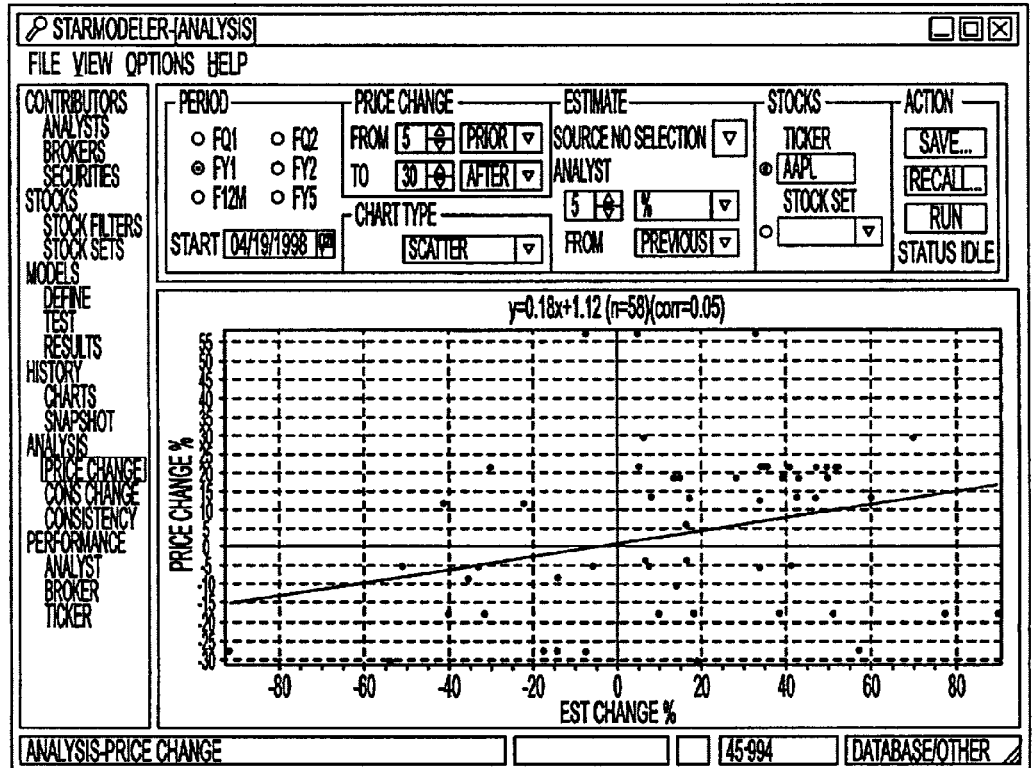

FIG. 28 depicts a screen display of an analysis screen according to an embodiment of the present invention.

Figure 29:
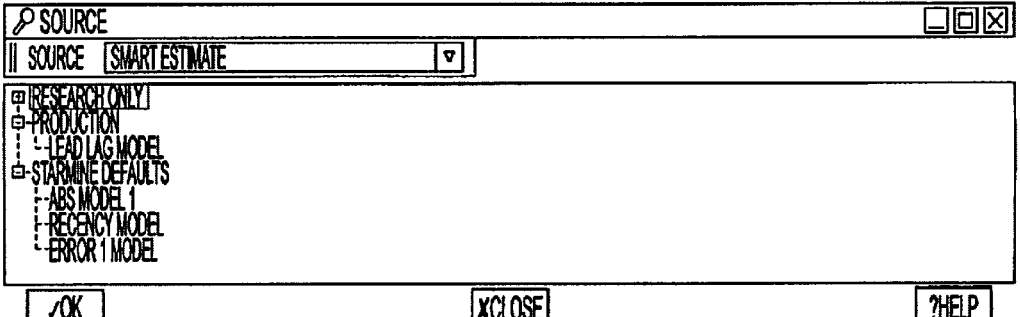

FIG. 29 depicts a screen display of various source selector screens according to an embodiment of the present invention.

Figure 30:
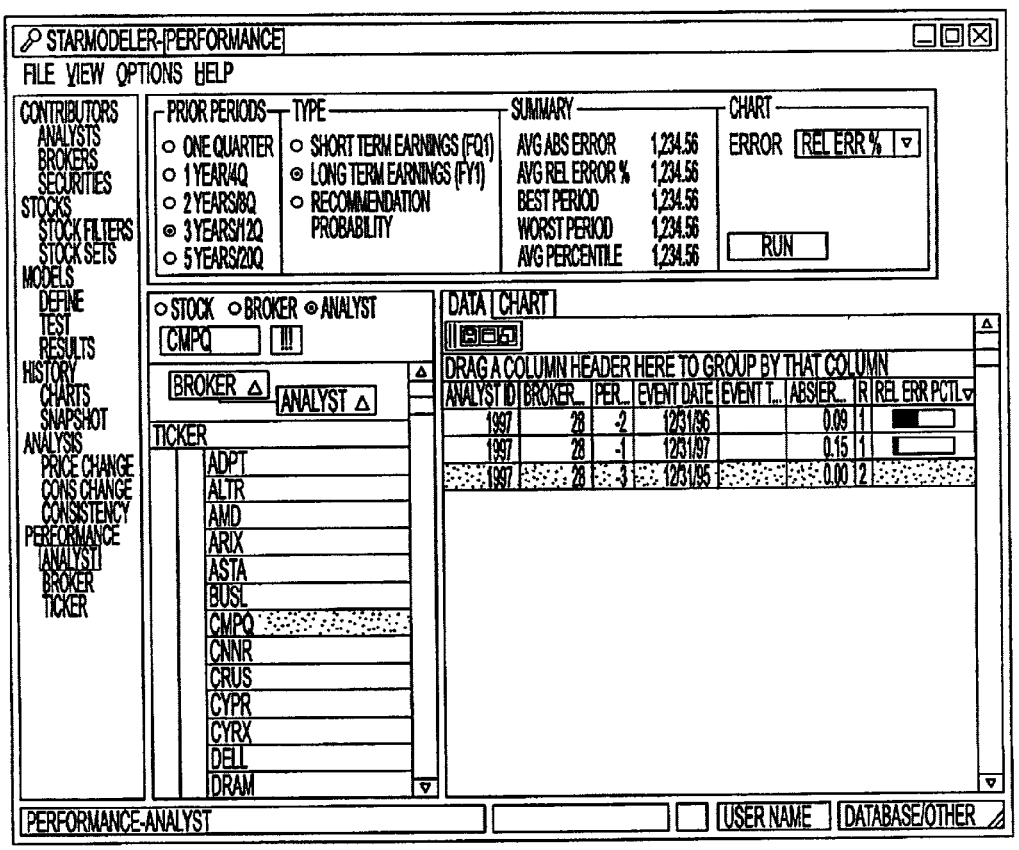

FIG. 30 depicts a screen display of a performance screen according to an embodiment of the present invention.

Figure 31:
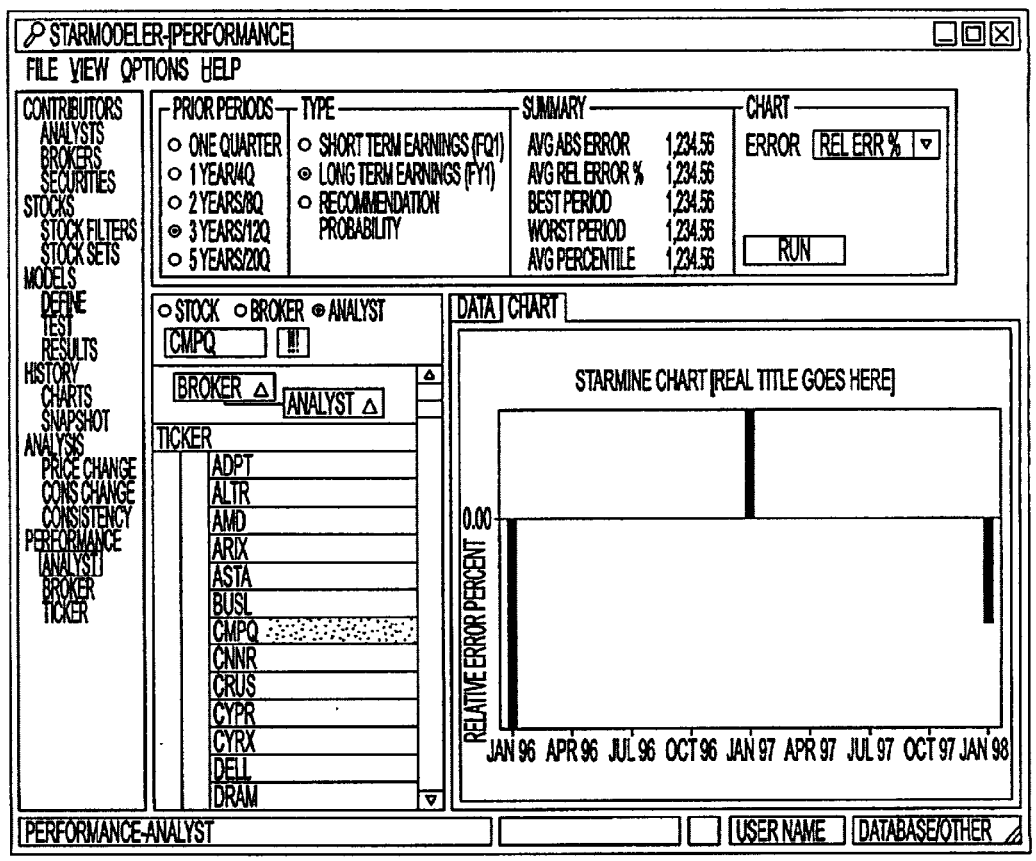

FIG. 31 depicts a screen display of a performance screen according to an embodiment of the present invention.

DETAILED DESCRIPTION OF THE PREFERRED EMBODIMENTS

Figure 1:
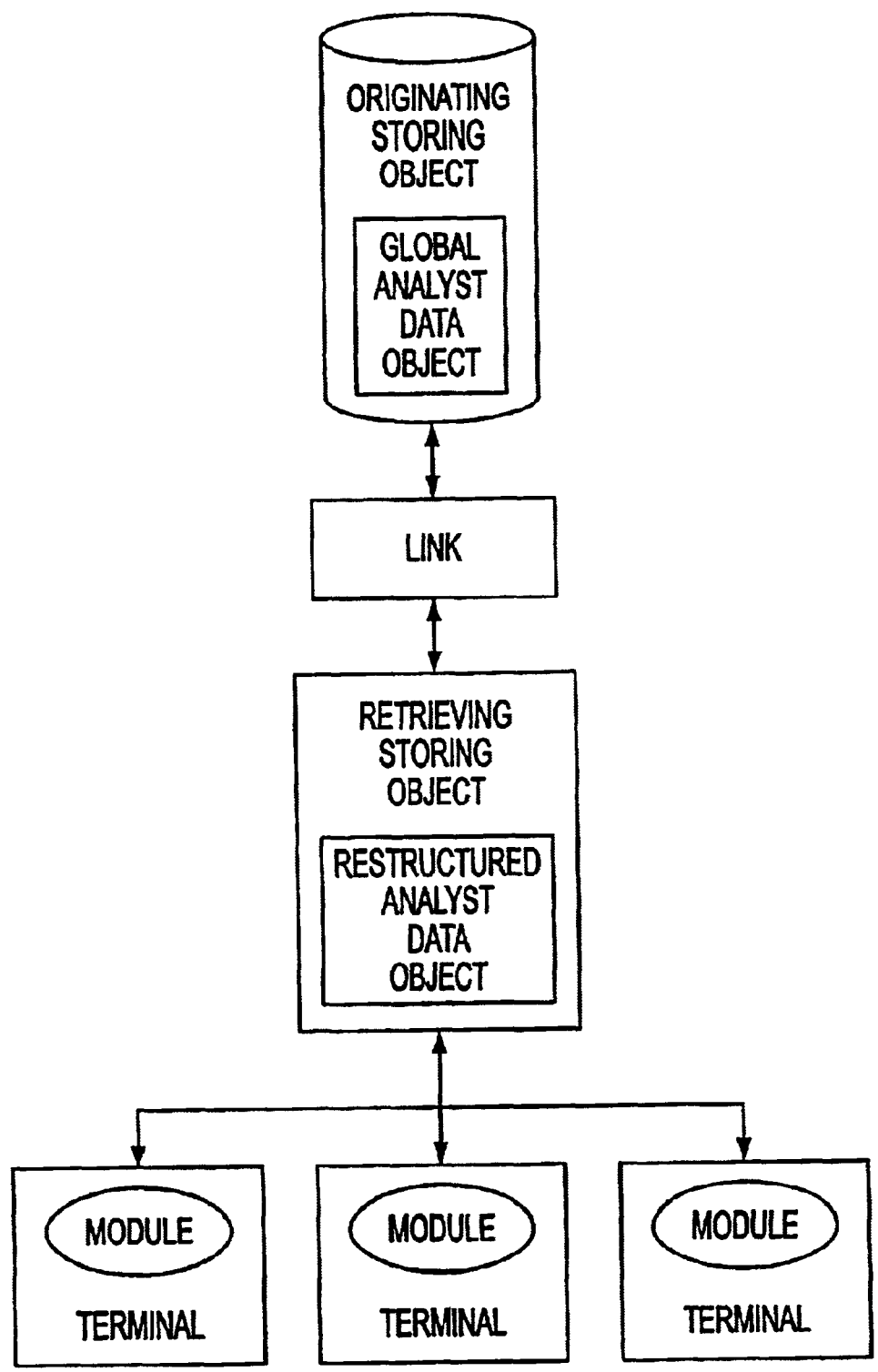
FIG. 1 is a high-level block diagram of the security analyst performance and tracking analysis system in accordance with the present invention.
Figure 2:
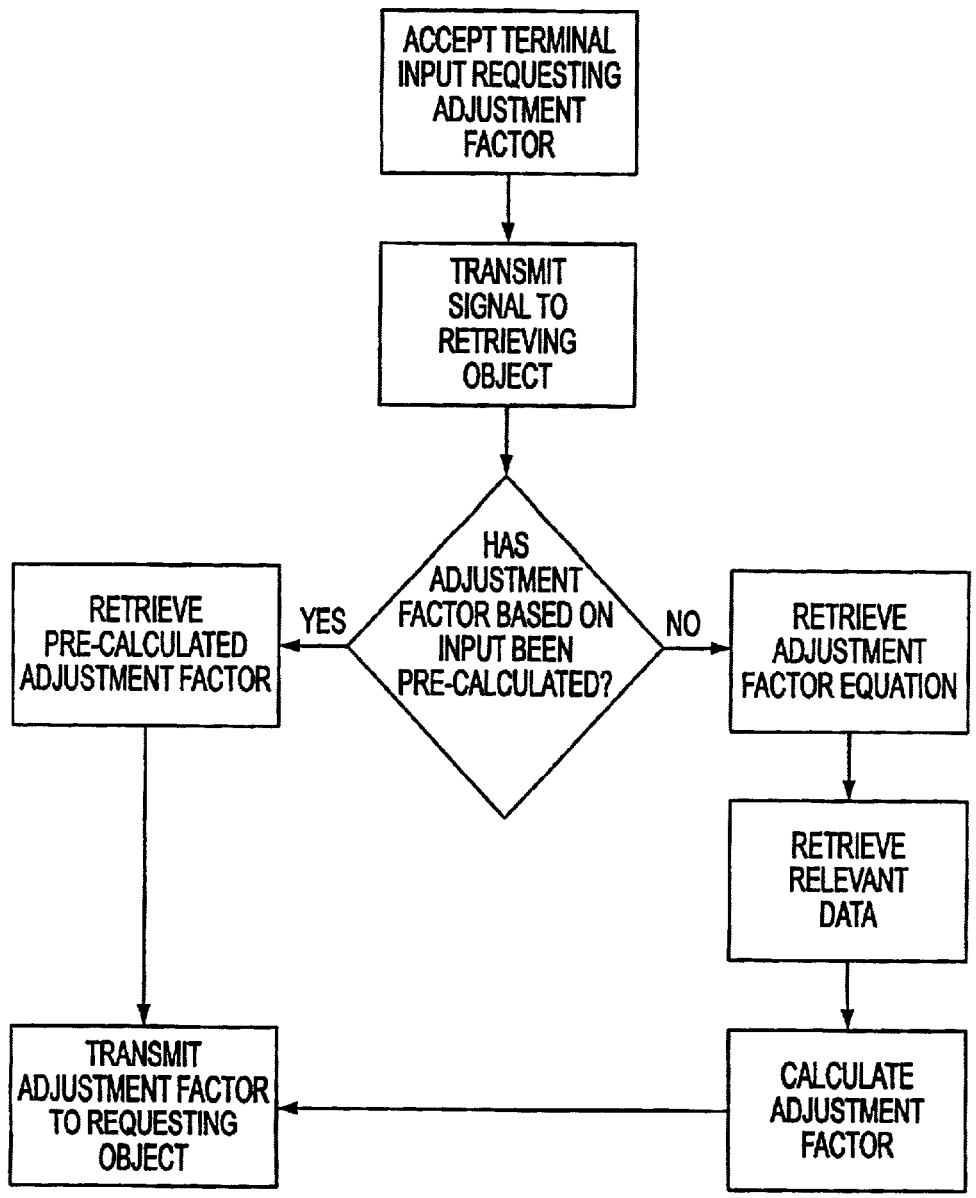
FIG. 2 is a flow diagram illustrating the method for determining the adjustment factor for a particular analyst's estimate.
Figure 3:
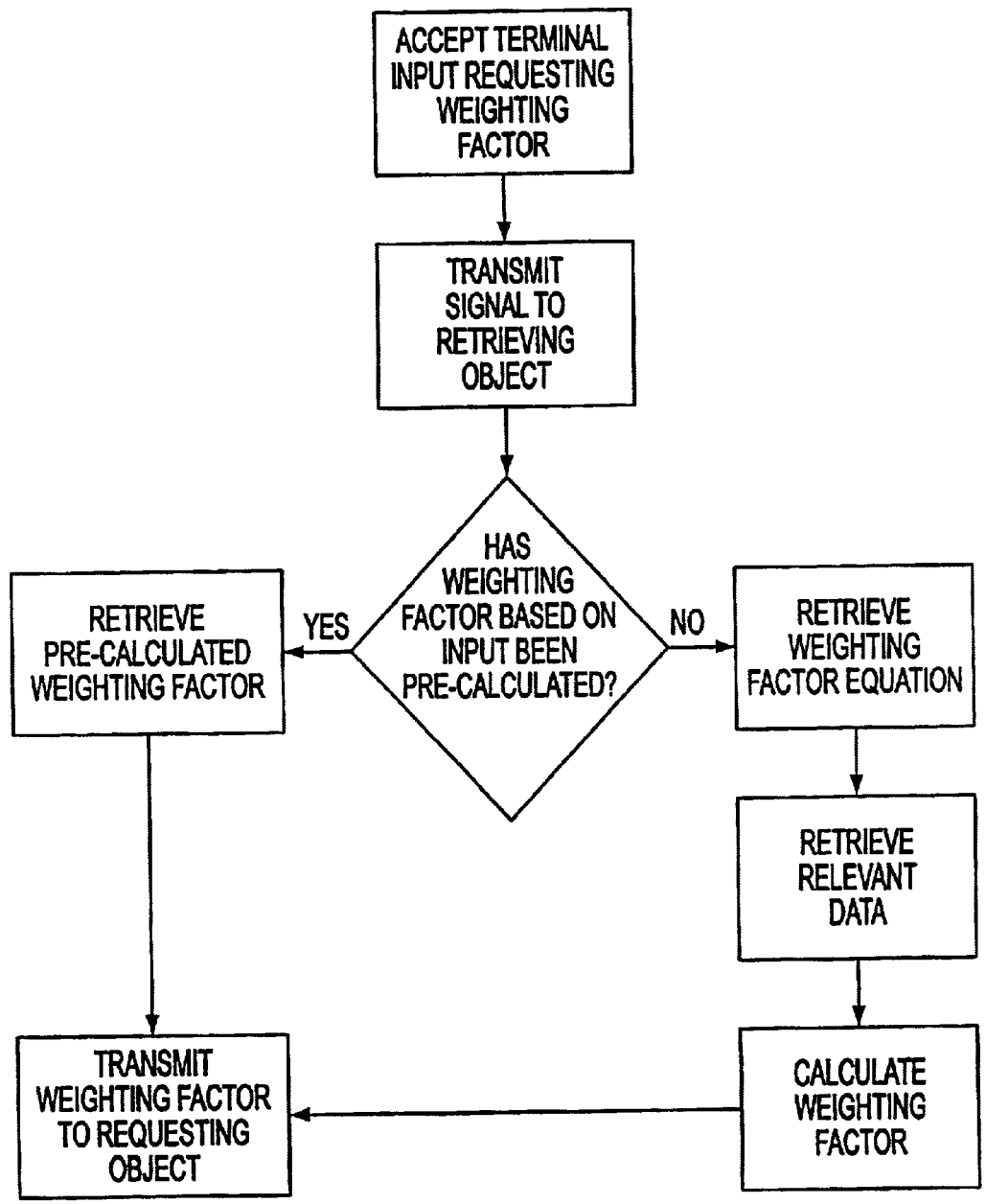
FIG. 3 is a flow diagram illustrating the method for determining the weighting factor for a particular analyst's estimate.

FIG. 1 is a block diagram illustrating a security analyst performance tracking and analysis system according to one preferred embodiment. In addition, FIG. 1 shows, in a broad sense, the data flow occurring within said system during a typical query for an analyst estimate comparison.

On an interim basis, which can occur either daily, monthly, or at any other period, a Global Analyst Data Object, containing historical data on analyst estimates, may be transferred or otherwise downloaded, through a telecommunications link or similar method or device, from an Originating Storing Object, such as a commercial database maintained by any one of a number of financial information service providers (FISP) such as IBES, Inc. (IBES) or Fist Call Corporation (First Call), to a Retrieving Storing Object, which will preferably, but not necessarily, take the form of a network server in a computer network such as, for example, a local area network.

The Global Analyst Data Object downloaded from the Originating Storing Object is typically comprised of numerous files and fields relating to historical data relevant to analyst earnings estimates and recommendations. An example of such a historical database is that maintained by financial information services provider IBES. IBES's database, known as the Daily Detail Earnings Estimate History, contains more than ten years of analyst estimate forecasts, compiled from data obtained from more than 200 brokerage houses and more than 2000 individual analysts, for United States companies. These files and fields contain both general and specific information on analyst estimates and related data including, but not limited to, information pertaining to financial instrument type and related identification codes, broker and analyst identification, industry groupings, and detailed information on such variables as the prices of particular securities on specific dates. Importantly, it should be noted that a Global Analyst Data Object may be used which contains analyst data pertaining not only to stocks publicly traded in the United States, but also international stocks and any other type of financial instrument currently in existence or created in the future.

Either during or after the downloading of the Global Analyst Data Object, the database files are manipulated and otherwise processed such that they are restructured according to predetermined data fields, thereby creating a Restructured Analyst Data Object. In this way, each analyst earnings estimate and recommendation is restructured to have a number of predetermined data fields.

As indicated above, the data comprising the Restructured Analyst Data Object will preferably reside on a server in a computer network. Using a computer terminal or other similar input device, a user will be able to access and utilize the application Module comprising the software for the present invention. This Module may or may not reside on the computer terminal operated by the user.

In a preferred embodiment, the architecture of the present invention may comprise various structures consistent with the present invention. Various structures, as depicted in FIGS. 10a–c may be provided. These systems may comprise tiers such as in an Internet based networking environment. The tiers may comprise a Presentation Layer, depicted in FIGS. 10a–c as a plurality of terminals. This tier may be operatively connected to a second tier known as the Application Layer, depicted as the Retrieving Object. Additionally, the Application Layer is preferably operatively connected to a third tier, or Data Layer, which is depicted as the Restructured Analyst Data Object. Other tiers may also be provided as depicted in the Figures.

In a preferred embodiment, historical data accessed from the Originating Storing Object is stored on the Restructured Analyst Data Object in addition to pre-calculated analyst-performance metrics derived from the Originating Storing Object. Because the data acquired directly from the Originating Storing Object may be proprietary of the data provider, the Retrieving Object preferably selectively delivers proprietary data only to those terminals having a license for the proprietary Originating Storing Object data. Also, the Retrieving Object preferably delivers only the pre-calculated analyst performance metrics derived from the Originating Storing Object to those terminals not having a license for the proprietary data. Using such a terminal and application module, a user may access and query the Restructured Analyst Data Object to perform any one of the numerous functions able to be performed by the present invention.

The pre-calculated data may comprise error metrics for each security, for each historical fiscal period in the database, for each contributor (e.g., analyst/broker pair) is a row in the database. Each row comprises multiple error metrics valued over a range of time periods. Error metrics may comprise various metrics including a raw error indicator (analyst estimate minus the actual earnings for a particular event), error percent to actual earnings, percent available (percent of time that an analyst had an estimate or recommendation available in the relevant time frame), error percent to consensus, and the number of days between the estimate of an event and the actual event, for example. Average error metrics may also be stored. Table 1 below provides one embodiment of average error metrics that may be maintained as well as other metrics that may be stored.

TABLE 1

|  | Event | 0–3 | 3–6 | 6–12 | 0–12 | 0–24 | Not pre-calculated (Calculated on-the-fly) | Comparable (across stocks, time periods) |
|---|---|---|---|---|---|---|---|---|
| Avg-Error $ |  | X | X | X | X | X |  |  |
| Avg-Abs Err $ |  | X | X | X | X | X |  |  |
| Avg-Abs Err %ile |  | X | X | X | X | X |  | X |
| Avg-Error % |  | X | X | X | X | X | X |  |
| Avg-Abs Err % |  | X | X | X | X | X | X |  |
| Avg-Rel Error % |  | X | X | X | X | X |  | X |
| Avg-Bias Error % |  | X | X | X | X | X |  | X |
| Actual-Divisor (for % calcs) | X |  |  |  |  |  |  |  |
| Swings |  |  |  |  |  | X |  | X |
| Hit % |  |  |  |  |  | X |  | X |
| Total Estimates |  |  |  |  |  | X |  |  |
| Follow % |  | X | X | X | X | X |  | X |
| LeadLagScore |  |  |  |  |  | X |  | X |
| MTBR |  |  |  |  | X |  |  | X |
| Best Date |  |  |  |  |  | X |  |  |
| Best Error (Rel Err %) |  |  |  |  |  | X |  |  |
| Year first followed | X |  |  |  |  |  |  |  |

The calculations to derive these error metrics are provided in Table 2. Example ranges, analysis of these values and characteristics are provided although other ranges, analysis and characteristics may also be provided.

TABLE 2

| | Formula | Range | Analyzing | Characteristic |
|---|---|---|---|---|
| Error $ | $$\frac{\sum_{t1}^{t2}(Est_T - Act_{Event})}{(\# \text{ Samples}) * PctAvail}$$ | Any | Closer to 0 is better | Error in dollars and cents |
| Abs Error $ | $$\frac{\sum_{t1}^{t2}|(Est_T - Act_{Event})|}{(\# \text{ Samples}) * PctAvail}$$ | 0 to Any | Closer to 0 is better. | Absolute Value of Error in $ and cents. When average is taken over interval, negative and positive errors do not cancel out-preserves magnitude of error but not sign. |
| Rel Error Pct | $$\frac{\sum_{t1}^{t2}|(Est_T - Act_{Event}| - |Con_T - Act_{Event}|)}{(\# \text{ Samples}) * PctAvail * Divisor}$$ | Any | Larger negative Numbers are better | Error Compared to the Consensus Error |
| Bias Error Percent | If analyst's estimate is further from the actual than the consensus estimate is, then Biaserror = Relative Error % Else Biaserror = 0 Average Bias Error % For period t1 . . . t2 = | Any. Usually a low number | Closer to 0 is better. | Relative Error % only if the Analyst is further from the actual than the consensus. |

TABLE 2-continued

| Formula | Range | Analyzing | Characteristic |
| --- | --- | --- | --- |
| $\dfrac{\sum_{t1}^{t2} \text{BiasError}}{(\text{\# Samples}) * \text{PctAvail}}$ | | | |

Additionally, other metrics including leadlag factor, swings, hits, hit percent, and mean time between revisions may be included as metrics. Table 3 below described these metrics, how they are calculated, analysis for these metrics, and a range for these metrics.

to, major revisions from other analysts. To achieve this, the system may measure whether an analyst estimate or revision is N standard deviations away from the consensus N (typically 5) days after the day the analyst's estimate was made. Swings may be measured over the 24

TABLE 3

| | Formula | Analysis | Range |
| --- | --- | --- | --- |
| Leadlag Factor | $\dfrac{(\text{Leads} - \text{Lags})}{\text{TotalEsts}}$ | Closer to 1 is better<br>1 = Always Leads, −1 Always Lags | −1.0 to +1.0 |
| Swings (i.e., number of times in period that analyst "stuck neck out" more than [SwingStdDevs = 1.5] standard deviations away from the consensus as measured [n = 5] days after estimate date T.) | A swing is defined as an estimate that satisfies this equation<br>$\dfrac{\|Est_T - Cons_{T+N}\|}{StdDev_{T+N}} > SwingStdDevs$<br>Defaults<br>SwingStdDevs = 1.5 and N = 5 | Many swings indicate that analyst is willing to express an opinion independent from the pack. (It does not indicate quality.) A low number of swings may indicate an anlyst that follows the pack. | Positite Integer, Or 0. |
| Hits | A Hit is a Swing that is closer to the actual than the consensus.<br>If $\|Est_i - Act\| < \|Cons_{I+N} - Act\|$ Then Hit Else Miss | — | Positive Integer or 0 |
| Hit Percent | $\dfrac{\text{Hits}}{\text{Swings}} \times 100\%$ | 100% indicates all Hits<br>0% indicates all misses<br>NA indicates no Swings | 0–100% |
| MTBR-Mean Time Between Revisions | $\dfrac{\text{TotalDaysActive}}{\text{TotalEstimates}}$ | Average in our current database is 89.1 days | 0–365 days |

These metrics are understood as follows:

Error $—The difference between Est, and the Actual. Expressed in dollars.

Abs Err $—The absolute value of Error $ at a point in time.

Bias Error Percentage—If Consensus>Actual, then Bias Error equals Relative Error %, else it is 0. If Consensus<Actual, then Bias Error equals Relative Error %, else it is 0.

Actual-Divisor (Applies to Err %, ABS(Err %), and RelErr %)—To facilitate cross-stock and cross-period comparison of error, we provide metrics that normalize estimates & error by the size of the actual earnings. Of course, for small actual values, errors become exaggerated. To avoid this, we limit the divisor to be no less than 0.40 cents for fiscal year events and no less than 0.10 for fiscal quarter events.

Relative Error Percentage—The difference between the analysts error and the consensus error, divided by the Actual-Divisor.

Swings—Often, major revisions (N Std Dev away from consensus) occur simultaneously for multiple analysts. For example, this may be the case when a company reports a large earning surprise or issues a warning about upcoming growth. "Swings," which are bold estimates that differ greatly from the consensus, are differentiated from major revisions that occur concurrently with, or near months prior to the report date. Unlike other error metrics which are calculated by sampling (continued) estimates over an interval and computing the corresponding average error, Swings may be determined by considering only the actual estimates or revisions. The default number of Std Dev is 1.5.

Hit Percent—A hit is a swing that proves to be closer to the actual than the consensus at N days after the date of the swing.

Total Estimates—The total number of estimates made by the analyst in the prior 24 months for the event. Confirmations are not included. An estimate pre-existing exactly 24 months prior to the report are counted in the total.

Follow Percent—In each time frame (0 to 3, 3 to 6, 6 to 12, 0 to 12, 0 to 24 months) we calculate the total availability of the analysts estimates during that time. Follow Pct equals the days the analyst estimate was available in the timeframe divided by the total number of days in the timeframe.

MTBR—Mean Time between Revisions—Measures frequency of analyst revision in the year prior to the report date. Equals the number of days in which there was an active estimate in the year prior to the report date divided by the Total Estimates.

Best Date—The day in which the analyst's error (RelErr %) was lowest in the 24 month prior to the report date for that event.

Best Error—The value of the analyst's lowest RelErr % at the corresponding Best Date.

Further, a lead lag score may be provided. In calculating the lead lag score, Table 4 represents calculations with the following understanding: $C_0$ represents the consensus on the day of the estimate in question, $C_1$ represents the consensus on the n-th day prior to the day of the estimate in question, and $C_2$ represents the consensus on the n-th day following the day of the estimate in question. These conditions are considered in this order to determine if an estimate is leading, lagging, or neither:

ment factor of 0.95 for that performance analysis set, such that the analyst's issued estimate over the specified time period is reduced by five percent. Conversely, an analyst who has historically issued estimates over a specified time period that were, in hindsight, on average too low might be assigned an adjustment factor of 1.10 for that performance analysis set, such that his actual reported estimate for that time period is increased by ten percent.

Notably, although the adjustment factor calculated for any given performance analysis set may be stored in the system's database, adjustment factors are typically generated in

TABLE 4

| # | Condition | Formula | Classified as |
|---|-----------|---------|---------------|
| 1 | Change in consensus, from n days prior to n days following estimate, must be at least Min %, (default = 5%). Else "neither" | $\|c_2-c_1\|/\text{MAX (FudgeFctr,}\|c_1\|) > \text{Min \%}$ | Else Neither |
| 2 | Concensus change prior to the esitmate must not be different in direction from change after the estimate. | (C2 > C1) AND (C2 >= C0) OR (C2 > C1) AND (C2 >= C0) | Else Neither |
| 3 | Number of Estimates/Revs Between [t-n to t + n] minus [# estimates at t] >= 2 | $\sum_{t-n}^{t+n} \text{Est} - \text{EstCount}_{t_0} \geq 2$ | Else Neither |
| 4 | If the Number of Estimates prior to the Estimate Date in the time frame are greater than the number of estimates after the report date in the time frame. Then this estimate is a lagging estimate | $\sum_{t+1}^{t+n} \text{Est} > \sum_{t-n}^{t-1} \text{Est}$ | Lagging |
| 5 | If the Number of Estimates prior to the Estimate Date in the time frame are less than the number of estimates after the report date in the time frame. Then this estimate is a Leading estimate | $\sum_{t+1}^{t+n} \text{Est} < \sum_{t-n}^{t-1} \text{Est}$ | Leading |
| 6 | If the Number of Estimates prior to the Estimate Date in the time frame are equal to the number of estimates after the report date in the time frame. Then this estimate is neither a leading nor lagging estimate. | $\sum_{t+1}^{t+n} \text{Est} = \sum_{t-n}^{t-1} \text{Est}$ | Neither |

For each analyst, each new estimate or revision made within 24 months of a report date for a fiscal period is classified either as Leading, Lagging or Neither according to the logic above. The LeadLagFactor is the number of Leading estimates minus the number of Lagging over the total estimates. If all estimates were lagging, the LeadLagFactor=−1.0; if All estimates were leading, the LeadLagFactor=+1.0. If all estimates were "neither" or if the number of Leading Estimates equals the number of Lagging estimates, the LeadLagFactor=0.0. Estimates already current at 24 months prior to the report date may not be included.

$$LeadLagScore = \frac{Leads - Lags}{TotalEstimatesForAnalyst}$$

Based on the information in this database, various other calculations may be derived. For example, based on the historical information for each analyst, an adjustment factor may be calculated. Generally speaking, the adjustment factor represents the analytical "bias" which may or may not be incorporated into each analyst's earnings estimate, for a particular security, over a given period of time. For example, an analyst who has, over a specified time period, issued earnings estimates for a particular company that were, in hindsight, on average too high, might be assigned an adjustreal time in response to user-defined inputs. As indicated above, the calculation of an adjustment factor will generally be based upon a comparison of the historical earnings estimates issued by an analyst, for a given security followed by that analyst, over a particular time period. A user may also define further analysis parameters and metrics such that, for example, as specified by a user, the determination of an adjustment factor may take into account an analyst's historical percentage error as compared to actual earnings, generally available consensus earnings estimates, custom composite adjusted earnings estimates, or other metric.

One example of a user-defined parameter is the assignment by a user of a scaling factor to be applied in the calculation of the adjustment factor for a given performance analysis set. For example, a user may define a performance analysis set such that, for that analysis set, a particular analyst is shown to have issued estimates that were on average 20 percent greater than actual earnings. The user will then be able to assign a scaling factor, say for example, 0.5, to be multiplied by the 20 percent error such that the effective adjustment factor for that user-defined performance analysis set reflects a 10 percent and not a 20 percent adjustment—i.e., an adjustment factor of 0.9, rounded to the nearest tenth. Thus, in this particular example, the user "discounted" the analyst's earnings estimate bias as indi cated by the system's calculations. The formula for the calculation of the adjustment factor is set forth below:

[1/(1+(Error metric*Scaling factor))]

An improved estimate of an analyst's earnings may also be accomplished by the calculation of a weighting factor which is used to provide a weighted average of an analyst's earnings estimate, as compared to other analysts. As with the adjustment factor, this weighting factor may be based upon a variety of user-defined parameters and metrics. For example, a weighting factor for a given analyst, security, and time period may be calculated based upon the relative recency of the issuance of analyst's earnings revision or the historical consistency and/or accuracy of an analyst's adjusted estimates (as compared to actual earnings), or a combination of these or other related factors or metrics. For example, if an estimate of one analyst is relatively old compared to an estimate or revision of a second analyst, the former might be assigned a relatively low weighting factor, (or even zero in some cases), as compared to a more recent estimate produced by the second analyst. This is done based upon the assumption that a more recent estimate is likely to be based upon relatively new and accurate information which may affect a company's earnings potential and, therefore, is more likely to be predictive of a company's actual earnings.

Similarly, a weighting factor for a given analyst, security, and time period may be calculated based upon the relative accuracy of one analyst as compared to another. For example, at a specific point in time prior to an earnings event for a specific security, analyst A might have issued an earnings estimate 25 percent greater than the actual earnings ultimately announced, whereas analyst B may have issued an estimate that was 100 percent greater than the actual earnings. Subsequently, at a later point in time, yet still prior to the announcement of actual earnings, analyst A might have revised his estimate so that it was 15 percent greater than the actual earnings, and analyst B may have simultaneously revised his estimate so that it was 80 percent below actual earnings. Although the average errors for both analysts A and B were 20 percent above the actual earnings, the variance over time for analyst A was much less than that for analyst B. Accordingly, analyst A's estimate of future earnings for this specific security might be assigned a weighting factor significantly higher than that assigned to the estimate of analyst B.

Regardless of how a weighting factor is calculated, based on the number of analysts being tracked, the total value of all weights will equal one. As a result, the weighting factor assigned to an analyst for a given performance analysis set is really a distribution number that is evaluated in the context of a set of a plurality of analysts issuing estimates regarding a particular earnings event for a particular security. Importantly, as indicated above, the weighting scheme employed can be controlled and altered by the user.

The adjustment and weighting factors described above may be used, together with an analyst's actual earnings estimate, to calculate a custom composite estimate to arrive at a more accurate estimation of a company's earnings. A custom composite estimate is calculated by multiplying an analyst's current earnings estimate (for a given security, time period, and other parameters) by its corresponding adjustment and weighting factors for that given performance analysis set. The results for each estimate for each analyst being studied are then summed to arrive at the custom composite estimate. It will be appreciated that the calculation of a custom composite estimate provides investment managers and similar users with a way of better predicting not only the accuracy of an analyst's earnings estimates but also the actual earnings of a company over any given period of time.

As indicated above, a predetermined system database is constructed such that each analyst estimate record in the database contains unique fields related to that estimate. In general, these records contain a combination of data fields present within the Global Analyst Data Object obtained from the FISP and data fields unique to and created within the system of the present invention. Typically, the fields in this restructured database may include an analyst identifier; an event identifier corresponding to a specific security; an event type and date (e.g., Apple, FY-1995 or Intel, Q2-1997); an estimate date; a raw error indicator which corresponds to an analyst's estimate minus the actual earnings for a particular event; other metrics such as the percent error from an analyst's estimate to either the actual earnings or the consensus error; or other error metrics defined by a user.

The typical system database record will also contain an Earliness field which contains the number of days by which an analyst's earnings estimate precedes a particular earnings event, such as a company's quarterly or annual earnings postings. This Earliness field can be employed to group estimates of similar Earliness into like Earliness Time Bins. It will be appreciated that this Earliness field or the usage of Earliness Time Bins will likely enhance numerous aspects of the present invention because, in many circumstances, the accuracy of an estimate made shortly before an earnings event is likely to be more accurate than an earnings estimate made months prior to the earnings event. Specifically, each Earliness Time Bin represents a range of days early such that prior analyst estimates may be classified according to particular Earliness Time Bins. For example, one Earliness Time Bin may include all estimates issued by a specified group of analysts for a given security between 7 and 30 days, inclusive, prior to an earnings event or between 31 and 90 days before such an event. In this way, this unique field will allow users to make meaningful and valuable comparisons between analyst estimates for any number of given time periods preceding a particular earnings event.

Importantly, in addition to the predetermined data fields discussed above, the database of the present invention may also contain and maintain indices for predetermined data relationships and predetermined analyst performance metrics for a plurality of analysts, such as time series estimates and summary measures of those estimates. Accordingly, by utilizing this restructured database, a user will be able to both rank and analyze the performance of a plurality of analysts based upon any metric. Moreover, based on the data contained in the system database, the present invention allows for the rapid visualization of the analyses of analysts' earnings estimates and buy-sell recommendations.

Figures 4, 5:
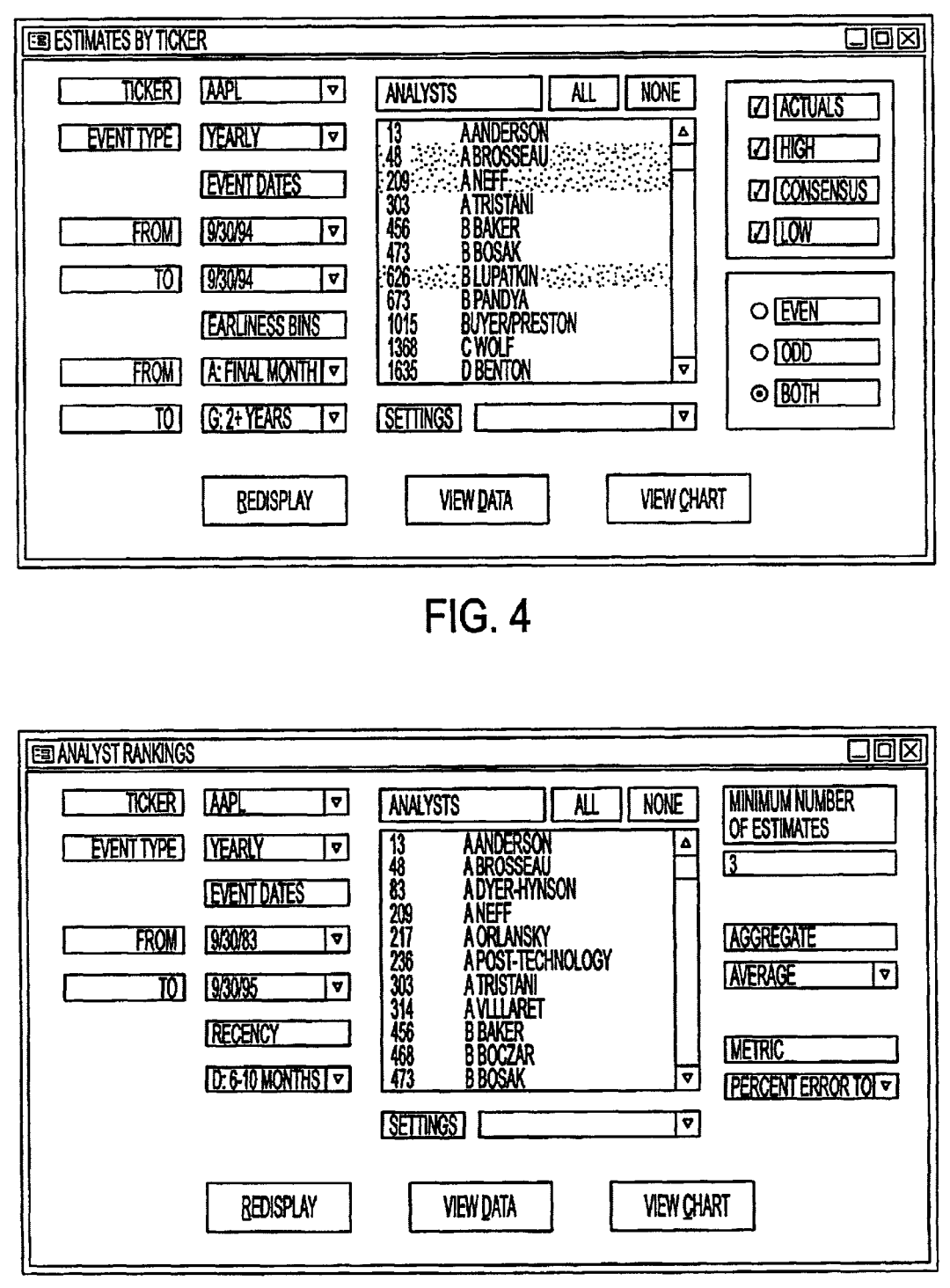

A front-end graphical user interface (GUI) is provided, examples of which are shown in FIGS. 4 and 5. Referring to FIG. 4, the graphical user interface shown contains a plurality of graphical buttons and selection boxes with pull-down menu capability. Preferably, the selection boxes correspond to predetermined fields contained within the system database such as a security identifier or ticker; an analyst; a plurality of event types, such as yearly and quarterly earning postings; earnings event dates; and dates corresponding to Earliness Time Bins. Notably, however, other fields and types of data may be included. Also, the GUI and system allow a user to manually input specific data not initially present in the database for analysis purposes. Manual inputs made by a user are thereafter stored within the system database such that the system may recall and list a user's prior inputs as part of a selection box's pull-down menu of selection alternatives. In this way, the front-end GUI allows a user to easily select from a large number and wide variety of analysis parameters and metrics.

According to one aspect of this embodiment, the historical earnings estimates of a single or plurality of analysts may be graphed using the GUI shown in FIG. 4. In this embodiment, a GUI similar to the one discussed above is used except that, in addition to the selection boxes and graphical buttons described above, there are graphical buttons present which allow a user to view a summary of the actual, high, low, and average consensus estimates as derived from the earnings estimates provided by all analysts within the system database. It is anticipated that at least one analyst can be excluded from a calculation using an exclusion function, described further below.

Figure 6:
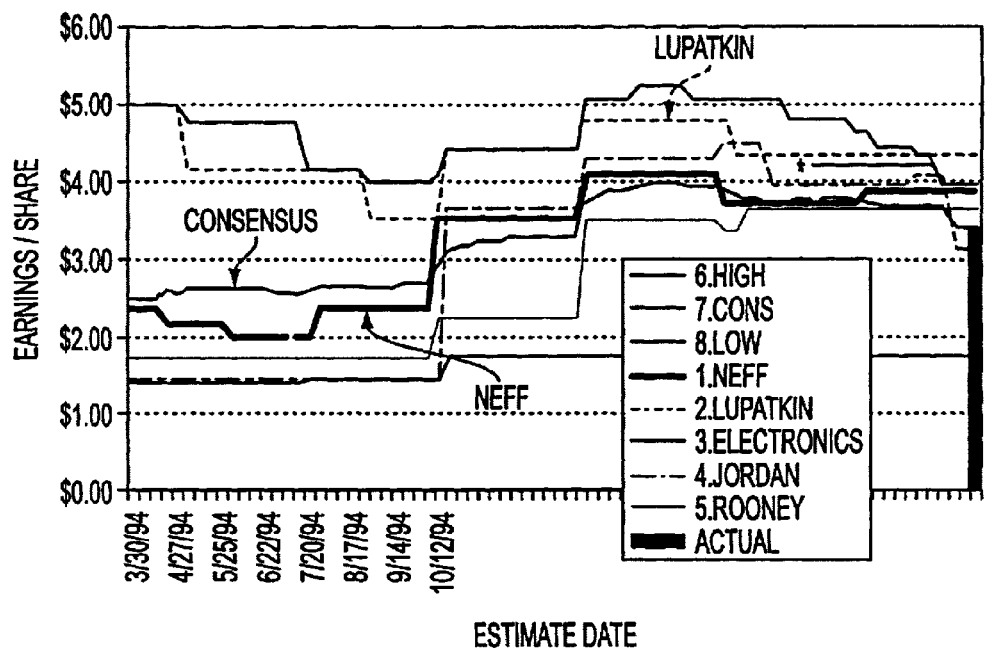
FIG. 6 is a sample illustration of the graph produced by actuating the GUI of FIG. 4.

Actuating the GUI display of FIG. 4 may generate, for example, the graph shown in FIG. 6. Referring to FIG. 6, it can be seen that the earnings estimates, and revisions of those estimates, of each analyst chosen in FIG. 4 are displayed simultaneously on a graph where the horizontal axis corresponds to a user-determined period of time or Earliness Time Bin, (preferably showing time in days) and the vertical axis plots the range of earnings estimates, (preferably in dollars and cents). More specifically, each analyst's earnings estimates and revisions over time are displayed as horizontal lines corresponding to and level with that analyst's earnings estimate for a particular time period. When an analyst makes a revision to an estimate, whether upward or downward, the change is plotted as a step function with a vertical or essentially vertical line connecting the two horizontal lines representing the difference between an analyst's earlier and revised estimates. The length of each horizontal line equals the number of days, as displayed on the horizontal axis, that the analyst's estimate was at that level. As dictated by a user's selection of analyses inputs from the GUI of FIG. 4, such a graph may also display the high, low, and average consensus estimates along with the estimates of the analysts specified by the user. Additionally, one or more vertical bars showing the actual earnings for the relevant security at specific earnings posting dates may also be displayed. To facilitate reading and interpreting the graph, each analysts' earnings estimate, as well as the high, low, and consensus estimate, and actual earnings bars may be displayed in a unique color. To further facilitate reading and interpreting the graph, a legend box may be displayed simultaneously with said graph which shows the colors associated with each estimate displayed.

It will be appreciated that viewing the historical estimates of a plurality of analysts in the manner described above may often provide a context within which an individual analyst's estimates and revisions can be better understood, such as by providing insight into an analyst's estimate revision patterns and the relative accuracy of those revisions over time as they relate to a company's actual earnings postings. As such, this information will likely be valuable in appraising specific revisions made by an analyst to his current estimates, and in deciding whether to act, or to not act, based upon the revisions.

According to another embodiment of the invention, the accuracy of analysts' estimates over a single or plurality of time periods, for any given earnings event, can be ranked and visually displayed. Specifically, referring to FIG. 5, a GUI is provided similar to the one shown in FIG. 4. In addition to containing selection boxes and graphical buttons pertaining to a security identifier or ticker, analysts, a plurality of event types, event dates, and dates corresponding to Earliness Time Bins, also included are selection boxes corresponding to the number of estimates made by an analyst; specific analysis metrics, such as raw error or percent error as compared to actual earnings; and average and standard deviation metrics.

Figure 7:
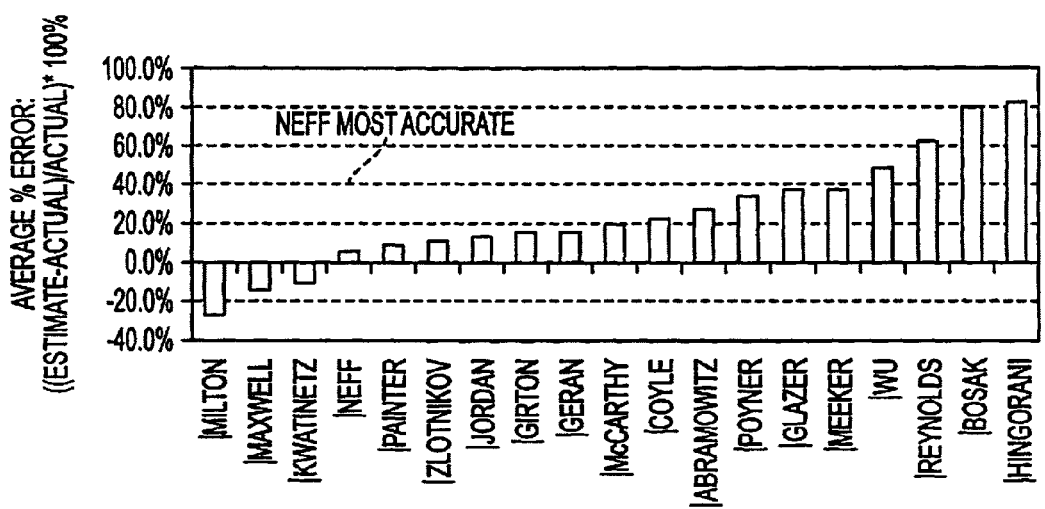
FIG. 7 is a sample illustration of a graph produced by actuating the GUI of FIG. 5.

The information retrieved using the GUI in FIG. 5 may be viewed either as raw, numeric data or, by using a data visualization technique, as a chart, graph, or combination thereof. As shown in FIG. 5, a user can specify a visualization preference by choosing from and actuating a particular GUI button, such as "view chart" or "view data." For example, FIG. 7 shows a bar chart, created by a user actuating the "view chart" graphical button in FIG. 5, illustrating a comparison of the average percent error of a plurality of analyst estimates, made in the 6 to 10 months prior to the end of Apple Computer's fiscal year. Preferably, all those analysts chosen by a user from the GUI of FIG. 5 are displayed simultaneously along the horizontal or y-axis. As shown, the vertical or x-axis displays a measure of the average percent error, both positive and negative, of the estimate of each analyst displayed as compared to the actual earnings for a given security. This visual display allows a user to essentially rank individual analysts by the accuracy of their estimates for a given period of time or Earliness Time Bin, prior to an earnings event, and to identify the analyst(s) with the most accurate earning estimate for a given security, earnings event, and preceding time period. In addition, this visual display clearly illustrates the earnings bias of individual analysts such that, patterns, if any, in an analyst's earnings estimations may be investigated and analyzed.

Additional information could also be incorporated into such a graphical display. For example, the vertical axis may display a measure of the average percent error, both positive and negative, of the estimate for each analyst displayed as compared to actual earnings. However, the bar representing and analysts estimate also shows, in addition to the percent error of the analyst's issued estimate, the high and low estimates, or percentile errors estimates (e.g., $90^{th}$ and $10^{th}$ percentile errors estimates), published by that analyst over the performance analysis set. A black section of an analyst's graphical bar may represent the average error for that analyst. Extending vertically above the black section is a bar segment which ends at a level representing that analyst's high estimate over the performance analysis set. Similarly, extending vertically below the black section of the analyst's bar is a bar segment which ends at a level representing that analyst's low estimate over the performance analysis set. Additionally, an analyst legend box may be displayed for each analyst which may show such information as the number of years an analyst has been providing estimates for the security in question, and the first and last period in which the analyst issued such estimates. In this way, the individual analyst legends may provide further historical context to the historical error performance graph of FIG. 7.

These graphs, such as the one in FIG. 7, may be generated by a user designating the performance set for (a) each analyst in list and (b) for each event chosen. Next, the system user fills estimate array with data, for all chosen analysts, to create estimate time series data array—e.g., estimate. After that, the system fills error array, for all chosen corresponding events and dates, to create time series error array—e.g., error. Next the system loops for each event chosen in the performance analysis set back through the previous steps. The system then calculates an error summary metric per analyst—e.g., average error—such as average error, standard deviation, 10 and 90 percent high and low etc. and does so for each analyst. The chart may thus be provided.

Figure 8:
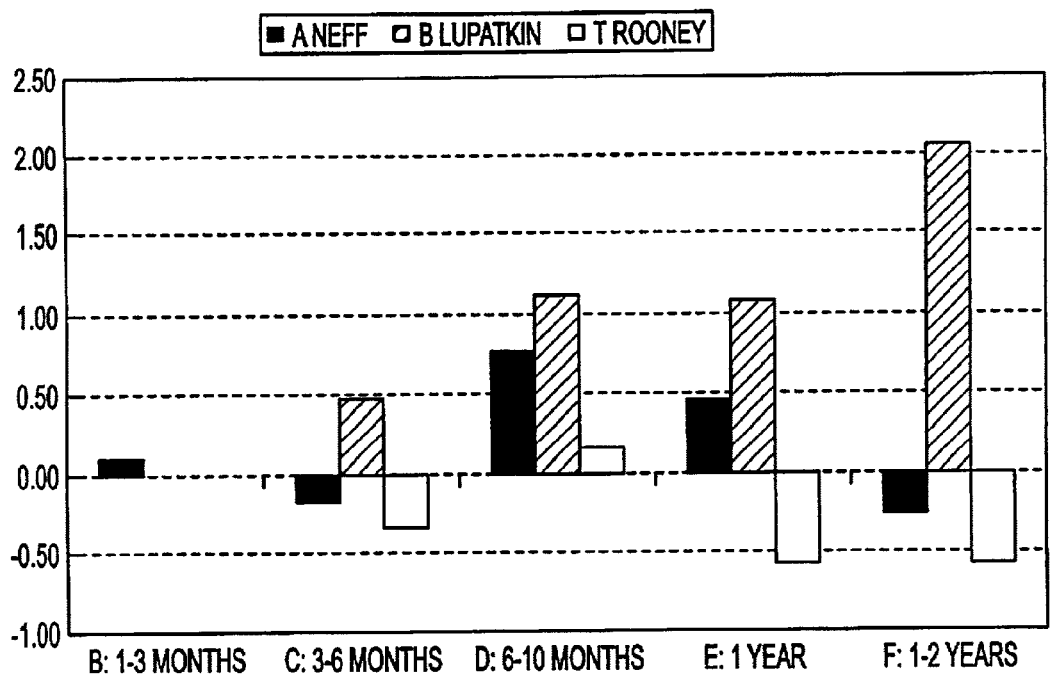
FIG. 8 is a sample illustration of a graph produced by actuating the GUI of FIG. 5.

Similarly, a visual display may also be generated which illustrates a comparison of analysts' performances over not just one but rather a plurality of time periods, as shown in FIG. 8. Here, the Earliness Time Bins chosen by the user are displayed in chronological order, with the most recent time period beginning on the left. The vertical axis displays a measure of the average percent error, both positive and negative, of the estimate of each analyst chosen by a user for analysis. A bar chart is generated wherein each analyst's percent error is indicated by a different color bar. In this way, a user can track a plurality of analysts' earnings estimates over time so as to determine when individual analyst's estimates are more accurate as compared to others.

Figure 9:
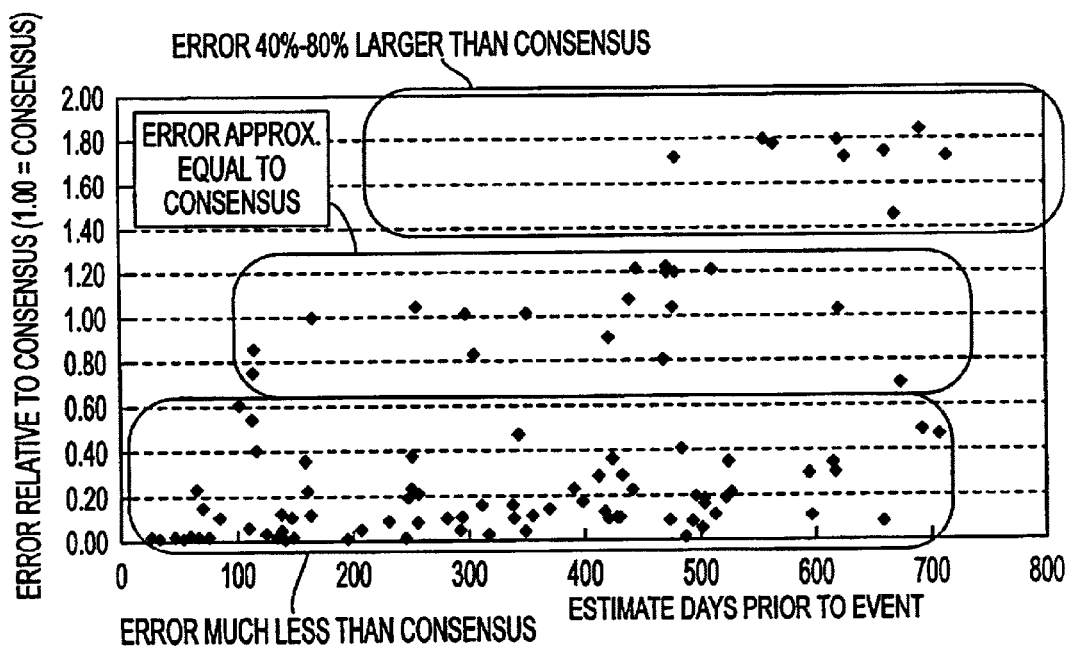
FIG. 9 is a sample illustration of a graph produced by actuating the GUI of FIG. 5.

The graph shown in FIG. 9 may also be generated by using the GUI of FIG. 5. Unlike the graphs of FIGS. 7 and 8, which plot the average percent error of analysts' earnings estimates as compared to other analysts for given periods of time, the graph of FIG. 9 displays a scatterplot of the error of a single analyst's estimates relative to the consensus estimate error at the time the analyst's estimates were issued. Here, the horizontal axis shows the number of days prior to the user-defined event, whereas the vertical axis shows the error relative to the consensus error. A value of one on the vertical axis corresponds to an estimate error that is equal to the consensus error. Each scatterpoint represents an estimate or revision made by an individual analyst at a specific date. Although not shown in FIG. 9, vertical lines perpendicular to the horizontal axis may be superimposed on the scatterplot chart to indicate the dates of various earnings events. It will be appreciated that by utilizing such a scatter display, a user may be able to ascertain at a glance which analysts are more likely, either in general or at specific points in time, to publish estimates that are more accurate than the current consensus estimate. Importantly, it should be noted that the graph of FIG. 9 may be used to display a scatter chart of any metric including, but not limited to, raw error, the percent error as compared to actual earnings, or other user-defined errors.

In another embodiment of the invention, a user will be able to construct, store, and recall custom composite earnings models for analysis and testing purposes. Specifically, the system will allow for users to create financial transaction models by inputting specific performance analysis sets, including performance metrics and other user-defined metrics and parameters, such as scaling factors, to arrive at specific custom composite earnings estimates. These performance analysis sets and corresponding custom composite estimates may then be stored in the system's database for later retrieval. In this way, a user will be able to test such models by applying them over any previous time period, thereby essentially creating a "virtual analyst" whose hypothetical prospective performance can be compared with the historical performance of a single or plurality of analysts, or even the average historical consensus estimates for any previous time period. Most significantly, it will be appreciated that by conducting such tests a user may be able to refine a model that can be used to accurately predict the accuracy of prospective, analysts' earnings estimates.

FIGS. 11a to 11c depict the purpose between the two different types of error calculation. In FIG. 11a, two analysts have made predictions concerning the earnings of a particular security. Their predictions, in dollars, are shown on the y-axis where $\$_0$ is the actual earnings, whereas the time at which the analysts made their predictions is shown along the x-axis. The difference between each of the depicted adjacent markings on the y-axis is equal to $, and the difference between each of the depicted x-axis markings is equal to T. The first analyst initially ($t_0$) predicted above the actual earnings by $\$_2$, and at time $t_1$ modified the prediction to an estimate below ($-\$_2$) the actual earning. The second analyst predicted earnings slightly below the actual earnings for the entire period shown.

Turning to FIG. 11b, which highlights the error associated with the first analyst's predictions, it is shown that the first analyst has an average error equal to zero because the extent of the overestimate is approximately equal to the extent of the underestimate. This raw error metric is preferably calculated as follows:

$$\sum_{t0}^{m} (\text{Estimate} - \text{Actual})$$

By substituting the values shown in FIG. 11b, the overestimate is found to be $(\$_2-\$_0)*(t_1-t_0)$ or 2$T and the underestimate is found to be $(-\$_2-\$_0)*(t_2-t_1)$ or $-2\$T$. Accordingly, the first analyst would receive a raw error of 0 and would accordingly be given no adjustment factor. In determining the weighting factor, however, the following equation which represents the absolute error metric, is preferably used:

$$\sum_{t0}^{m} |(\text{Estimate} - \text{Actual})|$$

Again substituting the values for the first analyst, an absolute error of 4$T is found. Applying the same analysis to the second analyst leads to a raw error of $-2\$T$ which could in turn be used to calculate an adjustment factor. Similarly, because the second analyst consistently underestimated the actual earnings, the second analyst would have an absolute error of $-2\$T$. Because the absolute error of the second analyst is half as great as the absolute error of the first analyst, the second analyst is preferably assigned a weighting factor greater than the weighting factor of the first analyst.

Because analysts start making predictions on a given security at different times, it is possible that a particular analyst will not have made predictions about a particular security for the entire duration over which an error analysis is being performed. In a preferred embodiment, it is possible to make proportional adjustments to various error analysis based on the percentage of time that a given analyst has been tracking a security.

Similarly, because analysts start making predictions on earnings at different times, it is similarly possible that certain analysts will not have made earnings estimates at a time when an unanticipated event lead to a significant error. In a preferred embodiment, the effect of such unanticipated events can be filtered by comparing the analysts predictions to a consensus estimate. Such a comparison is termed a relative error metric. The following equation provides an example of a relative error metric:

$$\sum_{t0}^{m} \frac{(|\text{Estimate} - \text{Actual}| - |\text{Consensus} - \text{Actual}|)}{\text{Actual}}$$

The relative error metric shows how a particular analyst performed in relation to the other analysts who were tracking a particular security over the analyzed period of time. The purpose of utilizing the actual earnings in the denominator of a preferred embodiment is to enable errors to be normalized so that comparisons can be made across different securities. Because small actual earnings can lead to exaggerated errors, it is possible to establish a minimum actual value, for purposes of this error metric, to prevent such exaggerated errors. For example, if the actual earnings were 0, then any analyst tracking the security would have an infinite error, so a value of, for example, $0.40 could be used to provide useful information from the analysis.

In another embodiment of the invention, a user will be able to rank, measure, and analyze the historical accuracy of a single or plurality of analysts' buy-sell recommendations in various ways. As an initial matter, a user will be able to control and otherwise define how recommendation descriptions used by a plurality of analysts are normalized and otherwise translated into scaled recommendation numbers.

Specifically, depending on the employer of an individual analyst, said analyst, when either upgrading or downgrading a particular security, will use varying descriptions to make his recommendation. For example, analysts at the investment firm Alex Brown issue recommendations using the following descriptions, predetermined by the firm: strong buy, buy, neutral, source of funds, or sell. In contrast, analysts at the investment firm Goldman Sachs issue recommendations using the following descriptions, also predetermined by the firm: priority list, recommended list, trading buy, market outperform, market perform, and market underperform. FISPs such as First Call translate and otherwise normalize the recommendation descriptions of the numerous analysts to a scale ranging from 1 to 5, with the following descriptions: 1 (buy), 2 (buy/hold), 3 (hold), 4 (hold/sell), and 5 (sell). The FISPs then calculate an average recommendation by calculating the mean of all analysts' current recommendations as translated to this 1 to 5 scale.

In the present invention, recommendation adjustment and weighting factors may be calculated in a way closely resembling that described above for analyst earnings estimates. For example, relatively recent recommendation upgrades or downgrades may be assigned a relatively high weighting factor while older recommendations may receive a weight of zero. Similarly, using these factors an improved custom composite recommendation may be determined which more accurately reflects the action (e.g., buy, sell, hold etc.) that a user should take with respect to a security. In addition, a user will have the ability to control the recommendation normalization process, if so desired, to replace the normalization performed by an FISP.

Moreover, using either the FISP generated recommendation scale or user defined scale, a user will have the ability to measure the historical profitability of a single or plurality of analysts' recommendations in much the same way as described above for analyst estimates. For example, using a GUI similar to FIGS. 4 and 5, a user can create a graph illustrating the average percent error of an analyst's recommendation as compared to the average recommendation.

Users will also have the ability to create and test portfolio creation rules. Specifically, a user can choose a security and then set up purchase and/or selling instructions that the system will make automatically. For example, a user can instruct the system to purchase a security when a specific analyst issues a recommendation of "2," double his investment if the recommendation is upgraded to "1," and sell all or a certain percentage of the security if and when the analyst downgrades his recommendation to "3" or lower.

FIG. 9 provides an example of a scatterplot graph created with the present invention. This scatterplot is generated using the following equation:

$$\sum_{t0}^{tn} BiasError$$

where bias error is equal to relative error if relative error is greater than the consensus error. If the relative error is less than the consensus error, then the bias error is assigned a value of zero over the selected time period. The consensus error is calculated the same as raw error is calculated for an individual analyst, except that the consensus estimate is used instead of the analyst's estimate. The bias error is useful in determining how consistently a given analyst or group of analysts outperforms the consensus for a particular security.

Another option available in a preferred embodiment is the ability to exclude at least one Analyst. For example, if a particular analyst had an extreme error during a period of analysis that a user is evaluating, then the consensus error might be too reflective of that individual analyst's error. Accordingly, a majority of analysts could have bias errors approximately equal to zero which indicates that they are outperforming the consensus estimate. If a user wants to filter out an analyst's estimate for this or any other reason, it is possible to exclude the analyst's estimate from a particular metric analysis.

In a preferred embodiment, there are additional metrics which can be used to evaluate how effectively an analyst acquires and reacts to information. One metric that serves to accomplish this task is the leadlag Factor. Preferably, the leadlag Factor is calculated as follows:

$$\frac{(Leads - Lags)}{TotalEstimates}$$

where leads is the number of times that an analyst makes an estimate revision before the majority of the analysts following a particular security, lags is the number of times that an analyst makes an estimate revision after the majority of the analysts following a particular security, and total estimates represents the number of predictions that the analyst has made. In a preferred embodiment, a user can select a leadlag factor based on a number of different variables, including which securities, which analysts, which time periods, which earliness bins, or any combination thereof.

Another metric that is useful in predicting how an analyst acquires and reacts to information is the hit percent. A hit percent is an evaluation of the number of times that an analyst successfully revises earnings. In a preferred embodiment, a swing is preferably an estimate that is outside a predetermined standard deviation of the mean of the consensus estimate. In a most preferred embodiment, a predetermined standard deviation of the consensus estimate is approximately 1.5. A hit is preferably a swing in which the analyst's estimate is closer to the actual earnings than the consensus estimate. A hit percent can then be determined by dividing the number of hits by the number of swings, and multiplying the result by 100%.

As discussed above, the system may provide the user with the option of viewing a large amount of information in a variety of different formats.

According to one embodiment, the user may desire to view contributors to see relationships between stocks, analysts and brokers, as for example, shown in FIGS. 12–14. In FIG. 12, the user may view by analyst, whereby the system presents analysts in the system and enables drilling into each analyst to see which firms they are associated with and which tickers they have followed. In FIG. 13, the user may search for a broker, and the system presents the brokers and enables drilling into the broker to view the analysts that work at the firm and the tickers followed by the analysts and the broker. In another screen, the user may search for a ticker such as a stock.

The system may also provide screens through which the user may manage stocks and stock groups against which analysis may be run. The user may do so through stock lists and stock filters. Stock filters may comprise tools for dynamically creating sets that are the result of user defined criteria for picking stocks including security type, country, market cap, P/E, analysts following, and earnings growth. FIG. 14 depicts an embodiment of a screen that enables a user to utilize these tools.

A model managing tool may also be provided and screens may be provided to enable users to manage these models. Such screens may comprise those depicted in FIGS. 15–24. A backtest screen used to apply a model to historical data to test the model's accuracy may be provided, such as depicted in FIG. 25.

Also, as shown in FIGS. 26–27, historical view screens may be provided. This provides a visual depiction of analyst's estimates over time and may be used to view trends, cluster points, visually backtesting models by placing a smart model that is calculated every N days in the chart as a visual analyst to visually see its performance against the consensus and the other analysts.

Also, as shown in FIG. 28, an analysis screen may be provided that presents the impact on the change in estimates and the change in stock prices or consensus estimates. The user may select a time frame to measure these factors, a time bin to analyze the appropriate data sources and a set of stocks to analyze. The application then calculates the answers and presents a chart, such as the one depicted in FIG. 28.

A source selector screen may also be provided to enable the user to select sources for performing this analysis. In the analysis, the variables may include the period, start date, price change/consensus change, source, source driving condition, and stock/stock sets to analyze and the sources may include brokers, analysts, clusters, and smart estimates.

A performance module may also be provides that enables users to see past performance at the broker, analyst and ticker level. The user may select the prior periods, performance type and error type to view.

Other views may also be presented as would be apparent to one of ordinary skill in the art and other embodiments and uses of the invention will be apparent to those skilled in the art from consideration of the specification and practice of the invention disclosed herein. Accordingly, the specification and examples set forth above should be considered exemplary only. The scope of the invention is only limited by the claims appended hereto.

What is claimed is:

1. A computer-implemented system for objectively measuring security analysts' performance based on historical accuracy of their earnings predictions for one or more securities, the system comprising:
   a database of historical data, the historical data including:
   (i) individual earnings predictions by a plurality of analysts pertaining to at least one earnings event for a given security;
   (ii) revisions made by an analyst to an earnings prediction prior to an actual earnings report date;
   (iii) actual reported earnings for earnings events for securities; and
   (iv) dates of the earnings predictions, revisions to earnings predictions, and the actual reported earnings;
   a user interface for selecting criteria, including one or more of a time frame over which earnings predictions are to be measured; a number of periods over which to measure performance; at least one error metric to be used to calculate performance; one or more securities over which to measure performance; and exclusion criteria by which to exclude certain earnings predictions; and a processor for determining performance based on the selected criteria and the historical data.

2. The system of claim 1, wherein the time frame includes a selected range of time prior to an actual earnings report date.

3. The system of claim 1, wherein the number of periods corresponds to a predetermined number of earnings events.

4. The system of claim 1, wherein the at least one error metric measures the accuracy of one analyst relative to the accuracy of other analysts that have made earnings predictions for the selected one or more securities.

5. The system of claim 1, wherein the at least one error metric measures an average of absolute errors for a selected analyst over a selected time frame.

6. The system of claim 1, wherein a user can select from one or more analysts, brokerages, or ticker symbols for which to measure performance.

7. The system of claim 1, further comprising means for enabling a user to create or modify models, wherein the models may include the use of accuracy scores determined by the user-selected criteria.

8. The system of claim 1, further comprising a display for enabling the user to selectively display performance data based on user-selected criteria.

9. A computer-implemented method of objectively measuring security analysts' performance based on historical accuracy of their earnings predictions for one or more securities, the method comprising the steps of:
   storing historical data in a database, the historical data including:
   (i) individual earnings predictions by a plurality of analysts pertaining to at least one earnings event for a given security;
   (ii) revisions made by an analyst to an earnings prediction prior to an actual earnings report date;
   (iii) actual reported earnings for earnings events for securities; and
   (iv) dates of the earnings predictions, revisions to earnings predictions, and the actual reported earnings;
   selecting criteria via a user interface, including one or more of a time frame over which earnings predictions are to be measured; a number of periods over which to measure performance; at least one error metric to be used to calculate performance; one or more securities over which to measure performance; and exclusion criteria by which to exclude certain earnings predictions; and
   determining performance based on the selected criteria and the historical data.

10. The method of claim 9, wherein the time frame includes a selected range of time prior to an actual earnings report date.

11. The method of claim 9, wherein the number of periods corresponds to a predetermined number of earnings events.

12. The method of claim 9, wherein the at least one error metric measures the accuracy of one analyst relative to the accuracy of other analysts that have made earnings predictions for the selected one or more securities.

13. The method of claim 9, wherein the at least one error metric measures an average of absolute errors for a selected analyst over a selected time frame.

14. The method of claim 9, further comprising the step of enabling a user to select from one or more analysts, brokerages, or ticker symbols for which to measure performance.

15. The method of claim 9, further comprising the step of enabling a user to create or modify models, wherein the models may include the use of accuracy scores determined by the user-selected criteria.

16. The method of claim 9, further comprising the step of enabling a user to selectively display performance data based on user-selected criteria.

* * * * *